(12) United States Patent
Landers et al.

(10) Patent No.: US 12,280,526 B1
(45) Date of Patent: Apr. 22, 2025

(54) SYSTEM AND METHOD FOR AUTOMATICALLY SETTING PARAMETERS FOR FOAM PRODUCTION

(71) Applicant: Evonik Operations GmbH, Essen (DE)

(72) Inventors: Rüdiger Landers, Osterode (DE); Philipp Tomuschat, Essen (DE); Jörn Kiwitt, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/853,890

(22) PCT Filed: Mar. 29, 2023

(86) PCT No.: PCT/EP2023/058129
§ 371 (c)(1),
(2) Date: Oct. 3, 2024

(87) PCT Pub. No.: WO2023/194176
PCT Pub. Date: Oct. 12, 2023

(30) Foreign Application Priority Data

Apr. 8, 2022 (EP) ..................................... 22167325

(51) Int. Cl.
*B29C 44/60* (2006.01)
*B01F 23/235* (2022.01)
(Continued)

(52) U.S. Cl.
CPC ............ *B29C 44/60* (2013.01); *B01F 23/235* (2022.01); *B01F 25/105* (2022.01); *B29C 44/28* (2013.01);
(Continued)

(58) Field of Classification Search
CPC ....... B29C 44/50; B29C 44/605; B29C 48/90; B29C 48/907; B29C 2037/90;
(Continued)

(56) References Cited

U.S. PATENT DOCUMENTS 2,834,748 A 5/1958 Bailey et al.
2,917,480 A 12/1959 Bailey et al.
(Continued)

FOREIGN PATENT DOCUMENTS

DE 25 33 074 3/1976
DE 42 29 402 3/1994
(Continued)

OTHER PUBLICATIONS

European Search Report received for PCT Application No. 22167325. 4, mailed on Oct. 12, 2022, 11 pages.
(Continued)

*Primary Examiner* — Stella K Yi
(74) *Attorney, Agent, or Firm* — Grüneberg and Myers PLLC

(57) ABSTRACT

A method sets machine parameters of a foam production machine. The foam production machine includes an intermediate conveyance unit configured to receive a reactive mixture, a plurality of fall plates having vertically adjustable ends and configured to receive the reactive mixture from the intermediate conveyance unit, and a conveyor configured to receive the reactive mixture from the fall plates. The method includes executing software by a computer system, where executing the software includes importing characteristics of the foam production machine and a rise profile for the reactive mixture, and iteratively determining process and machine parameters, including reactive mixture flow rate, conveyor speed, a dimension of the intermediate conveyance unit, and vertical positions for the ends of each fall (Continued)

plate resulting in a predefined predicted profile of the reactive mixture on the plurality of fall plates.

20 Claims, 7 Drawing Sheets

(51) Int. Cl.
  *B01F 25/00* (2022.01)
  *B01F 101/00* (2022.01)
  *B29C 44/28* (2006.01)
  *B29K 75/00* (2006.01)
  *B29K 105/04* (2006.01)
(52) U.S. Cl.
  CPC ... *B01F 2101/2805* (2022.01); *B29K 2075/00* (2013.01); *B29K 2105/04* (2013.01)
(58) Field of Classification Search
  CPC ... B29C 2037/903; B29C 39/44; B29C 43/58; B29C 45/76; B29C 48/92; B29C 49/78; B29C 51/46; B29C 53/8041; B29C 44/28; B29C 44/30
  See application file for complete search history.

(56) References Cited

U.S. PATENT DOCUMENTS

| | | |
|---|---|---|
| 3,346,557 A | 10/1967 | Patton et al. |
| 3,629,308 A | 12/1971 | Bailey et al. |
| 3,887,670 A | 6/1975 | Porter |
| 3,933,695 A | 1/1976 | Omietanski et al. |
| 4,042,540 A | 8/1977 | Lammerting et al. |
| 4,147,847 A | 4/1979 | Schweiger |
| 4,855,379 A | 8/1989 | Budnik et al. |
| 5,306,737 A | 4/1994 | Burkhart et al. |
| 5,357,018 A | 10/1994 | Burkhart et al. |
| 5,844,010 A | 12/1998 | Burkhart et al. |
| 6,359,022 B1 | 3/2002 | Hickey et al. |
| 7,138,077 B2 | 11/2006 | Ehbing et al. |
| 7,219,041 B2 | 5/2007 | Hamann |
| 7,645,809 B2 | 1/2010 | Ehbing et al. |
| 7,671,103 B2 | 3/2010 | Eilbracht et al. |
| 8,334,355 B2 | 12/2012 | Henning et al. |
| 2006/0167125 A1 | 7/2006 | Bauer et al. |
| 2007/0072951 A1 | 3/2007 | Bender et al. |
| 2007/0238800 A1 | 10/2007 | Neal et al. |
| 2007/0270518 A1 | 11/2007 | Nutzel |
| 2007/0282026 A1 | 12/2007 | Grigsby, Jr. et al. |
| 2008/0234402 A1 | 9/2008 | Lehmann et al. |
| 2009/0088489 A1 | 4/2009 | Terheiden et al. |
| 2012/0190762 A1 | 7/2012 | Hubel et al. |
| 2012/0323350 A1 | 12/2012 | Yamamoto et al. |
| 2015/0031781 A1 | 1/2015 | Landers et al. |

FOREIGN PATENT DOCUMENTS

| | | |
|---|---|---|
| DE | 42 39 054 | 5/1994 |
| DE | 102 37 005 | 2/2004 |
| DE | 103 11 027 | 9/2004 |
| DE | 10 2004 001 408 | 7/2005 |
| DE | 10 2007 046 860 | 4/2009 |
| EP | 0 380 993 | 8/1990 |
| EP | 0 493 836 | 7/1992 |
| EP | 0 533 202 | 3/1993 |
| EP | 0 780 414 | 6/1997 |
| EP | 0 839 852 | 5/1998 |
| EP | 0 656 382 | 8/1998 |
| EP | 0 867 465 A1 | 9/1998 |
| EP | 0 867 465 B1 | 6/2000 |
| EP | 1 161 474 | 8/2000 |
| EP | 1 393 877 A2 | 3/2004 |
| EP | 1 537 159 | 3/2004 |
| EP | 1 393 877 A3 | 9/2004 |
| EP | 1 678 232 | 4/2005 |
| EP | 1 544 235 | 6/2005 |
| EP | 1 683 618 A2 | 7/2006 |
| EP | 1 712 578 | 10/2006 |
| EP | 1 683 618 A3 | 11/2007 |
| EP | 1 977 825 | 10/2008 |
| EP | 1 985 642 | 10/2008 |
| EP | 1 985 644 | 10/2008 |
| EP | 2 182 020 | 5/2010 |
| EP | 2 481 770 | 8/2012 |
| EP | 3 907 056 | 11/2021 |
| WO | 96/12759 | 5/1996 |
| WO | 00/47647 | 8/2000 |
| WO | 00/58383 | 10/2000 |
| WO | 2004/020497 | 3/2004 |
| WO | 2005/033167 | 4/2005 |
| WO | 2005/085310 | 9/2005 |
| WO | 2005/118668 | 12/2005 |
| WO | 2007/111828 | 10/2007 |
| WO | 2013/131710 | 9/2013 |
| WO | 2020/085587 | 4/2020 |
| WO | 2021/071808 | 4/2021 |

OTHER PUBLICATIONS

FSK, "PUR-Kaltschaum Technische Fachgruppe PUR-Weichschaum", Produkt Beschreibung, Mar. 23, 2016, pp. 1-3.
Gonzalez et al., "Digital Image Processing", Chapter 10, Image Segmentation, Third edition, 2008, pp. 689-794.
Gonzalez et al., "Digital Image Processing", Chapter 11, Representation and Description, Third edition, 2008, pp. 795-860.
Gonzalez et al., "Digital Image Processing", Chapter 12, Object Recognition, Third edition, 2008, pp. 861-909.
International Search Report received for PCT Application No. PCT/EP2023/058129, mailed on Jul. 21, 2023, 6 pages.
Written Opinion received for PCT Application No. PCT/EP2023/058129, mailed on Jul. 21, 2023, 9 pages.

SYSTEM AND METHOD FOR AUTOMATICALLY SETTING PARAMETERS FOR FOAM PRODUCTION

CROSS-REFERENCE TO RELATED APPLICATIONS

This application is a National Stage entry under § 371 of International Application No. PCT/EP2023/058129, filed on Mar. 29, 2023, and which claims the benefit of priority to European Patent Application No. 22167325.4, filed on Apr. 8, 2022. The content of each of these applications is hereby incorporated by reference in its entirety.

BACKGROUND OF THE INVENTION

Field of the Invention

Certain embodiments of the invention relate to the field of polyurethane foam. More specifically, certain embodiments of the invention relate to systems and methods for flexible polyurethane foam production.

Description of Related Art

PU flexible slabstock foams have long been known from the state of the art and are used worldwide for the production of upholstered furniture and mattresses, for example. In the manufacturing process, the usually liquid components are pumped into a mixing head, mixed and continuously dosed onto a conveyor belt. There the reaction mixture begins to foam up, i.e., to expand. The driving force for this is the formation of gaseous reaction products (e.g., $CO_2$) as well as the evaporation of physical blowing agents. To prevent the reaction mixture from flowing away to the side, the conveyor belt is limited laterally by side walls. In slabstock technology, the foam can therefore rise freely in at least one direction (e.g., upwards). The pressure in the gas bubbles of the rising foam is usually roughly equivalent to atmospheric pressure. The reaction mixture expands vertically during the simultaneous horizontal movement on the conveyor belt and forms long blocks ("slabstock foam") in the continuous process, which are then cut according to certain lengths and transferred to the reaction store. During the ascent, the progressive cross-linking of the reactive components causes the material to solidify and therefore the firm but elastic flexible polyurethane foam is finally obtained. Shortly before the solidification of the material, the cell opening still takes place in connection with the loss of a small part of the cell gases and a slight sagging back of the just not yet solid foam block. The process is relatively fast and often takes less than 2 minutes until solidification. As the foam expands on a flat conveyor belt, the foam grows upward along the sidewalls. Friction on the sidewalls prevents the increasingly highly viscous foam mixture from growing at the edges, but not in the center of the block. This results in a rounded dome shape at the top. The height of the foam block therefore then differs in the center (higher) and at the edges (lower). With typical block heights of e.g., 100 cm, the difference can easily be 5 to 10 cm.

In the early days of the polyurethane industry, large discontinuous boxes were filled with the reaction mixture and box foams were obtained after foaming. Today, due to its low efficiency, this technique is actually only used for test foaming and in laboratories. The term continuous or discontinuous describes how the reaction mixture is mixed and dosed. In a discontinuous production method, the raw materials are mixed, the mixing is stopped and then dosed. In a continuous production method, the operations are carried out simultaneously (in parallel) without interruption, i.e., raw materials are continuously fed into a mixing head, mixed there with a continuously rotating stirrer, and continuously dosed onto, for example, a conveyor belt. This application deals with continuous production processes of flexible slabstock polyurethane foam.

There has been no lack of attempts to continuously improve the production of flexible polyurethane slabstock foam and, in particular, to reduce the resulting cutting and waste rates. For this purpose, the formed rectangular cross-sections of the foam blocks and their optimum dimensioning are important in order to be able to cut rectangular mattress cores out of the foam blocks as efficiently as possible, for example. Rounded block tops increase the waste rate, since rectangular mattress cores cannot be cut from the top layer. An important step in creating rectangular block cross-sections was to expand the foam not only upwards, but also at least partially downwards. This has the advantage that the foaming mixture now only has to rise a shorter distance up the side walls. In the case of a complete expansion downwards, there is even no rising of the reaction mixture at the side walls. Instead, it flows downwards along the side walls. Here, however, gravity helps. This is technically realized in the continuous slabstock plants by a so-called fall plate system. This was especially developed by the company Laader Berg and first implemented in the so-called MAXFOAM machines. Here the reaction mixture is applied in an elevated position onto a foil or a coated paper. The paper moves with a constant speed, which is given by the conveyor belt at the end of the machine. Once the expansion of the reaction mixture starts, fall plates ensure that the foam can expand downwards. The level of the upper edge of the reaction mixture remains constant or rises only slightly. The fall plates are fixed in their dimensions, but their height can be adjusted. In this case, the fall plates are each connected at the end to the adjacent fall plates. The speed of the paper on which the reaction mixture is located can also be varied via the drive of the conveyor belt. When all parameters are set correctly, this technology continuously obtains foam blocks that have an almost perfectly rectangular geometry. As a result, this technology is now widely used in the flexible polyurethane foam industry and has been adopted by other polyurethane machine manufacturers.

However, a general problem here is that now the rise profile of the reaction mixture and the position on the production machine must be matched to each other. Figuratively speaking, the rise profile of the foam must be mirrored downwards to give the correct setting of the fall plates. If, on the other hand, the fall plate system and the rise profile are not correctly matched, a wide variety of errors will occur with regard to the foam blocks produced. These include the fall plate system not working if it is applied too early and expansion then occurs on the flat conveyor belt, or cracks forming in the foam block because a foam is already solidifying on the fall plates. For more detailed technical descriptions of the process, please refer to the Polyurethane Handbook by Gunter Oertel ($2^{nd}$ edition, 1994, Carl Hanser Pub. Inc.).

Thus, the synchronization of the rise profile and the machine setting is the main problem with the current state of the technology. The gradient or rise profile is a property of the reaction mixture and depends on many factors. Among other things, it reflects the reactivity of the raw materials, the temperatures of the raw materials, but also the type and quantity of the selected catalysts. Different flexible slabstock foam formulations therefore have very different rise profiles. The rise profile is characterized by the time-dependent recording of the height of the expanding foam mixture.

Two points of the rise profile are of special importance: the moment when the mixture starts to expand (position of the creaming point) and the moment when it stops expansion (position of the full rise point) (due to cell opening and blow-off of gases). Creaming and blow-off are well defined phenomena taken place in the expansion phase of flexible polyurethane foam. Both are characterized by sharp events which could also visually be detected: while creaming the raw material mixture gets milky and intransparent and starts to rise. At the blow-off bubbles at the surface of the foam burst, gases are released and the foam surface settles a bit. When the height of the reaction mixture is recorded in a time resolved way, a rise profile is obtained. Both phenomena could be detected in this curve by a change of the slope: at the creaming the differential quotient turns from zero into a positive value. At the blow-off the differential quotient turns from a positive value into zero or even into a negative value. As both phenomena could be localized precisely in the rise profile curve in such a way they are called creaming point or blow-off point. The blow-off point represents the maximum height of the foam during expansion and is therefore also called full rise point. When a formulation is transferred to a continuous industrial production machine for flexible polyurethane foam ("slabstock technology") both phenomena could be seen as well, but take place in a layer in the reaction mixture perpendicular to the foam block movement. As foam production is usually observed by a view from atop the term "line" is usually used. It is a line on the foam surface across the width of the conveyour belt. A creaming line or a blow-off line (also "blow line") is visible in this case. The expression creaming line or blow-off line/full rise line refers therefore to the creaming or blow-off happening in a flexible foam slabstock production, the terms creaming point or blow-off point both refer to the rise profile curve.

Both points can be directly taken from the rise profile. If the rise profile is to be transferred to the machine, the time axis must be converted into a distance on the machine (from the start of the machine or from the application of the reaction mixture). This can be done by precisely measuring/calculating the dwell times after the reaction mixture has passed through the mixing head until it is on the paper. From there on, the foaming mixture moves at the conveyor belt speed. The rise profile of the foam can then be converted to a spatially resolved rise profile on the machine. Also the position of the creaming point and/or the position of the full rise point are in this way transferred to special positions on the machine. Those positions are compared to optimum positions. Once this is done, the fall plates and also the belt speed can be adjusted to obtain the ideal desired gradient. If necessary, the formulation can also be adjusted so that the modified rise profile better fits the situation on the machine. One possibility for this are, for example, modified catalyst concentrations. If necessary, both machine parameters and formulation details can also be changed.

For the prediction of correct machine settings when using, for example, a new formulation, the rise profile of the formulation needs to be known. This is sometimes done by a rough calculation that estimates the rise profile. Generic S-shaped rise profiles are conventionally used, and then adjusted using defined activity parameters for the catalysts, together with the concentrations and temperature of the raw materials. However, these rise profiles are only calculated/estimated approximately. This often leads to deviations of the calculated rise profiles from the real ones, which severely limits the predictability of the production process.

Furthermore, there are also many special foam types for which the calculated rise profiles obviously do not accurately represent the rise profiles seen on a continuously operating PU foam machine. In this case, unsuitable machine parameters are obtained and error patterns are obtained for foaming on industrial slabstock foam machines. Such non-optimized foaming processes on industrial plants are quite cost-intensive with dosing quantities of e.g., 250 kg/min and minimum running times of several minutes and reduce the confidence in the simulation software altogether.

In addition, there is a problem especially for the first-time production of new foam formulations whose foaming behavior is largely unknown. That is, in order to obtain the necessary, still unknown optimal machine settings for a new foam formulation, there are currently only two possible ways. In a first way, the foaming may be tested on a large production plant. This involves starting with already established or assumed settings and producing one or more test blocks. These are analyzed and the settings modified. Improved conditions are then selected in a new foaming process. Thus, the optimized machine parameters are then found in an iterative process. The process is time consuming and costly.

Furthermore, it is the opinion of many technicians that significant differences exist between laboratory rise profiles and production rise profiles. That is, it is generally questioned to what extent discontinuous foaming (laboratory foaming) and continuous foaming processes (industrial production) can be compared at all.

DE10237005A1 describes the measurement of the rise heights in a continuous slabstock foam production. This is done by means of sensors placed above the rising foam mixture. By knowing the rising behavior and the machine setting selected for the production process, it is then possible to calculate the foam's rising profile or predict optimized machine parameters. This patent with the complex and cost-intensive measurement of the foaming behavior in a real industrial production plant clearly shows the industrial interest in obtaining meaningful rise profile data. However, the simpler way of an upstream representative measurement of laboratory rising profile data is not chosen here, but instead the in-situ measurement in a real production. This can be explained by the fact that the authors do not expect any meaningful rise profile data obtained from discontinuous laboratory foams.

Ultrasonic measuring sensors have existed for some time for the measurement of rise profiles in the laboratory. A combination of sensor and foam software from Format Messtechnik ("FOAMAT") (Format Messtechnik GmbH, Im Schlehert 26, 76187 Karlsruhe, Germany) is particularly widespread. Although the description uses rise profiles to determine rise time or compares rise profiles against each other (for example to determine activity parameter for catalysts), use or export to a program to simulate rising on a continuous foaming machine is not disclosed or anticipated (for example, see www.format-messtechnik.de/foamat_d.htm #Steigh%C3%B6he%20und%20Steigprofil).

Since the kinetics and the reaction sequence of the polyurethane reactions are of great interest for various applications, there have also been several attempts to calculate the reactions. This also includes the rise profiles of PU flexible slabstock foam formulations. Examples of such calculations/simulations can be found e.g., in a project of the Fraunhofer Institute for Industrial Mathematics (for example, see https://www.itwm.fraunhofer.de/de/abteilungen/sms/komplexe-fluide-und-mehrphasenstroemung/simulation-polyurethanschaum.html). However, the focus here is on the expansion of flexible polyurethane foams in closed molds and not on freely rising flexible foams. But again, the use of simulated rather than real measured rise profiles demonstrates the difficulties in transferring results from laboratory foaming to a production process (albeit molded foam in this case). In the flexible polyurethane foam industry, kinetic data measured in the laboratory (such as rise profiles) are generally considered to be of little significance for large-scale industrial slabstock foam production. The background to this is the completely different mixing energies when mixing the raw materials by hand in an open cup/vessel compared to a closed mixing chamber with a high-performance stirrer. The air input and thus the nucleation efficiency also differs significantly here, which manifests itself in different cell structures.

All in all, it would be a considerable advantage for the slabstock industry to overcome the deficiencies of the state-of-the-art as described above, and to make correct simulations and reliable predictions for the rising of the reaction mixture during a slabstock production.

BRIEF SUMMARY OF THE INVENTION

Various embodiments provide a system and method for foam production and products provided by the method as described by the subject matter of the independent embodiments. Advantageous embodiments are described in the dependent embodiments. Embodiments of the present invention can be freely combined with each other if they are not mutually exclusive.

In one aspect, the invention relates to a method for automatically setting machine parameters of a foam production machine. The foam production machine includes a mixing head configured to mix precursor reagents for forming a reactive mixture, an intermediate conveyance unit configured to receive the reactive mixture from the mixing head, a plurality of fall plates, where a proximate end of a first fall plate is configured to receive the reactive mixture from the intermediate conveyance unit and where each fall plate has vertically adjustable ends, and a conveyor configured to receive the reactive mixture from a last fall plate, where the reactive mixture forms a foam on the conveyor. The method includes executing software by a computer system, where the computer system includes at least one processor, and where executing the software includes importing, from a database, characteristics of the foam production machine, the characteristics including one or more of:
  at least one dimension of the intermediate conveyance unit, a range of conveyor speeds, a number of fall plates and a range of vertical positions for the vertically adjustable ends of the fall plates,
  importing, from the database, a rise profile for the reactive mixture of the precursor reagents, the rise profile preferably comprising a height of the mixture as a function of time as the precursor reagents react,
  determining a position of a creaming point and/or a position of a full rise point, determining a conveyor speed from the range of conveyor speeds based on the rise profile, determining a position of a creaming line and/or a position of a full rise line based on the rise profile and the determined conveyor speed, comparing the position of the creaming line and/or the position of the full rise line towards optimum values, determining a flow rate of the reactive mixture to the first fall plate and a value for the least one dimension of the intermediate conveyance unit based on at least one of the following determinations:
  the determined conveyor speed, determined position of the creaming line determined position of the full rise line and/or a predefined target height hr of the foam, and preferably a predetermined density of the foam on the conveyor,
  iteratively repeating the determining providing a final flow rate, a final value for the at least one dimension of the intermediate conveyance unit, a final conveyor speed and a final position of the creaming line and/or a final position of the full rise line, determining, based on the rise profile and the final conveyor speed, vertical positions for the ends of each fall plate resulting in a predefined predicted profile of the reactive mixture on the plurality of fall plates as the reactive mixture is transported along the plurality of fall plates by the conveyor moving at the final conveyor speed, and storing, in the database, at least one of: the final flow rate, the final value for the at least one dimension of the intermediate conveyance unit, the final conveyor speed, and the vertical positions for the ends of each fall plate.

These features have the advantages of automatically setting machine parameters of the foam production machine resulting in a predefined predicted profile of the reactive mixture on the plurality of inclined fall plates, thereby reducing production time and production waste associated with operation of foam production machines.

According to one embodiment, the method comprises determining a flow rate of the reactive mixture to the first fall plate and a value for the least one dimension of the intermediate conveyance unit based on at least one of the determinations: the determined conveyor speed, determined position of the creaming line, determined position of the full rise line and/or a predefined target height hf of the foam, and a predetermined density of the foam on the conveyor.

According to one preferred embodiment, the method comprises determining a flow rate of the reactive mixture to the first fall plate and a value for the least one dimension of the intermediate conveyance unit based on the determined conveyor speed, determined position of the creaming line, determined position of the full rise line, and/or a predefined target height hf of the foam and a predetermined density of the foam on the conveyor.

According to one embodiment, the intermediate conveyance unit comprises a trough having a lip and a volume and configured to receive the reactive mixture from the mixing head, where the proximate end of the first fall plate is configured to receive the reactive mixture from the lip of the trough, where at least one dimension of the trough includes at least one of trough height, trough width, and trough length, where the height of the trough is the distance between a bottom of the trough and the lip.

According to another embodiment, the intermediate conveyance unit comprises a pour plate configured to receive the reactive mixture from the mixing head, where a position of the mixing head is adjustable for depositing the reactive mixture at a laydown position on the pour plate, where the proximate end of the first fall plate is configured to receive the reactive mixture from an end of the pour plate distal to the laydown position, and where the at least one dimension of the pour plate includes a distance between the laydown position on the pour plate and the proximate end of the first fall plate.

These features have the advantages of providing intermediate conveyance units having adjustable dimensions for enabling quick and automatic adjustments to the position of the creaming line and/or the position of the full rise line of the reactive mixture during the process of determining the final settings for the machine parameters.

According to yet another embodiment, the method includes adjusting a position of the trough such that a vertical distance between the lip of the trough and the conveyor is approximately ⅔ of the predefined target height hr of the foam.

In another embodiment, the method includes adjusting a position of the pour plate such that a vertical distance between the pour plate and the conveyor is approximately ⅔ of the predefined target height hr of the foam.

In one embodiment, the position of the creaming line is located a distance of approximately ⅓ the height of the trough below the lip.

In another embodiment, determining the value for the at least one dimension of the pour plate includes selecting the distance between the laydown position on the pour plate and the proximate end of the first fall plate such that the position of the creaming line is located approximately 15 cm before the proximate end of the first fall plate.

According to another embodiment, the predefined distance of the position of the full rise line is in the range of from 0.2 m to 1.2 m, preferably from 0.3 to 0.8 m, more preferably from 0.4 m to 0.7 m, after the distal end of the last fall plate.

In one embodiment, the steps of determining and adjusting for providing a final flow rate, a final value for the at least one dimension of the intermediate conveyance unit and a final conveyor speed are repeated (i.e., iterated) once, twice or several times till values converge to be constant.

In one further embodiment, the sensor for determining the rise profile is an ultrasonic measuring sensors and/or a 3D laser scanner and is formed to communicate data with the executing software of the computer system and/or the at least one processor. The senor can be formed to communication of data directly with the executing software or indirectly. The indirect communication can include the processing and/or at least temporary storage of measured data and/or converted data.

In one further embodiment, the method comprises the determination of the height and/or the height gradient by a sensor of at least two defined inspection areas or inspection corridors of the rise profile and/or the foam surface, either in the laboratory or in-situ at the production machine and the production process, respectively. These discrete areas can be the expected area or corridor of the creaming line, the expected first maximum height of the formed foam, the boarder area along a side wall and/or other characteristic areas or corridors.

These features have the advantages of providing a fast process for setting the machine parameters of the foam production machine. That is, since the method is robust for most, but not all reactive mixtures, only one or two iterations are required for the solution to converge.

In another embodiment, the predefined predicted profile has a substantially flat top surface, where the substantially flat top surface has an inclination angle of approximately arctan [(predefined fraction of a height of a foam on the conveyor)/(a horizontal length of the plurality of inclined fall plates)]. In a further embodiment, the predefined fraction of the height of the foam on the conveyor is approximately ⅓ the height of the foam on the conveyor.

These features have the advantages of providing a foam block having improved uniformity in, for example, density distribution and hardness, as well as providing a foam block having a substantially horizontally flat top surface, thereby reducing waste of material.

In another embodiment, the production machine further includes a machine control unit, where the machine control unit includes at least one machine processor, controller software executable by the processor, and an actuator unit that includes one or more actuators for controlling the settings of the foam production machine. The method further includes executing the controller software by the at least one machine processor, where executing the controller software includes receiving data including at least one of: the final value for the at least one dimension of the intermediate conveyance unit, the final conveyor speed, the final flow rate and the determined vertical positions for the ends of each fall plate, generating control signals based on the received data, and sending the control signals to the actuator unit for automatically controlling the settings of the foam production machine.

These features have the advantages of automatically controlling the settings of the foam production machine via actuators, thereby reducing direct physical user interaction with the machine and thus reducing the risk of human (operator) error and increasing efficiency and productivity for foam production.

BRIEF DESCRIPTION OF SEVERAL VIEWS OF THE DRAWINGS

The following embodiments of the invention are explained in greater detail, by way of example only, making reference to the drawings in which.

DETAILED DESCRIPTION OF THE INVENTION

Figure 1:
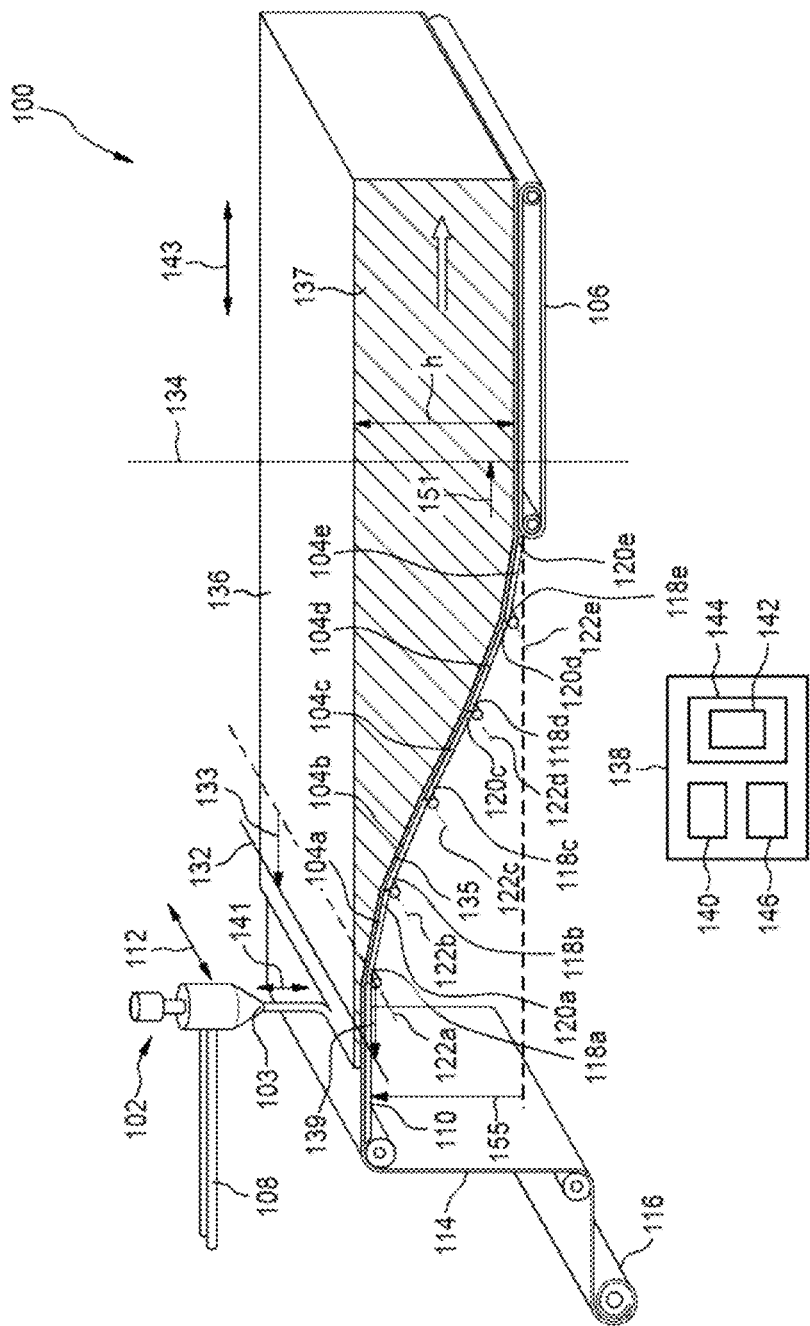
FIG. 1 illustrates a foam production machine, according to an embodiment of the present disclosure.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present disclosure relates to the field of PU flexible foams. Herein, a process for improved prediction of parameters for industrial PU flexible slabstock foam production is described. Although significant differences exist between laboratory discontinuous flexible polyurethane foam production and large-scale continuous flexible polyurethane foam block production, it has nevertheless been found that by using tailored conditions in laboratory discontinuous foam production, accurate predictions of optimal machine parameters for continuous flexible slabstock foam production are possible by transferring laboratory slabstock data to simulation software.

It has been surprisingly found that accurate simulations of the rise behavior can be obtained and accurately fitted machine parameters can be derived by importing and using carefully and representatively measured rise profiles in the laboratory. A rise profile may be measured in a laboratory experiment under defined conditions and uploaded to simulation software for the slabstock foam production process in order to obtain precise and reliable predictions. It has been found that by importing precisely measured laboratory rise profiles into a simulation process for the production process, accurate predictions can be derived for the optimized machine conditions to be selected. It is important to make the laboratory foaming as representative as possible for large-scale production. This includes bringing the raw materials to the temperature to be used in the production trial, but also foaming into a thermally insulated box/crate. The heat capacity and heat conductivity of the walls of the box should be small. Suitable materials include insulation foams like rigid insulating polyurethane foam (PUR or PIR foam) or polystyrene foams. Furthermore, the same process liner used in a big production plant might also be used in the box foaming experiment to separate the box from the reaction mixture (also referred to as reactive mixture).

Surprisingly, a rise profile of a laboratory foam experiment, which is performed on a much smaller scale than a production process and also discontinuously, gives reliable predictions for setting the machine parameters in simulation software for the large-scale slabstock foam production process.

The process for improved prediction of parameters for industrial PU flexible slabstock foam production, as described further below, may include one or more of: (1) the creation of a PU flexible foam formulation; (2) the measurement of the time-resolved rise profile (also referred to as a slump profile) in the laboratory (using, for example, laser or ultrasonic distance measurement and data recording); (3) the maintenance and/or conversion of the data; (4) the uploading of the slump or rise profile data into the production process simulation software; and (5) the derivation of the production process parameters and the simulation of the production process.

In one embodiment, the measurement of the rise profile in the laboratory is carried out in such a way that the same temperatures are chosen as in industrial practice and the rising of the foam takes place in thermally insulated boxes.

The optional maintenance and/or conversion of the data includes the processing of the measured rise profile data and the application of correction factors to correlate laboratory and machine conditions. In one embodiment, the preparation of the rise profile data includes the deletion of data point before the start of the rise of the foam and the normalization of the rise profile to % of the maximum rise height (max rise height=100%). The creaming time (the time till the expansion starts) can be provided for further processing as well as the full rise time (where expansion stops)

The transfer of the prepared rise profile data and when given the creaming and full rise time to the simulation software can be done in different database or table formats. The simulation software for the industrial foaming process uses the measured rise profile data for the calculation of the rise of the polyurethane foam during the industrial production of polyurethane foam. Parameters related to the fall plates, as well as output quantity and conveyor speeds (e.g., a conveyor belt speed), may then be derived.

As discussed briefly above, the invention is in the technical field of polyurethane (PU) foam production, more specifically software configured to import a rise profile of precursor reagents, including a catalyst, which when mixed together as a liquid, form flexible PU foam (e.g., a flexible PU foam block). The rise profile is generated via profile measurements taken of the liquid mixture in a laboratory as it reacts to form a foam. The software uses the imported rise profile to calculate machine parameters of a foam block production machine, such as, but not limited to, one or more of conveyor speed (e.g., conveyor belt speed), mixing trough size and/or position and pivot point positions of inclined fall plates, where such machine parameters relate to optimizing a profile of the foaming mixture on a conveyor system of the machine. Optimizing the profile of the foaming mixture on the conveyor belt system of the machine includes providing a substantially flat (i.e., substantially horizontal) profile of the foaming mixture on a series of inclined fall plates as the foaming mixture is transported across the series of inclined fall plates to a conveyor, such as a conveyor belt.

The substantially flat profile of the foaming mixture on the series of inclined fall plates results in a foam block on the conveyor that has an essentially flat top surface, in contrast to the rounded or domed top surfaces of foam blocks produced by conventional systems and methods.

Embodiments of the invention provide solutions to the current state-of-the-art problems of using S-shaped rise profiles based on calculating a creaming point (in time) and a full rise point (in time), where such calculations are based upon the mixing reagents, and then fitting an S-shaped curve between the creaming point and the full rise point. Such S-shaped fitted rise profiles are not particularly accurate representations of the true rise profiles and are particularly inaccurate when the components of the liquid mixture and/or the liquid mixture that generates the foam has non-standard or unusual densities, blowoff agents and/or ratios.

Embodiments of the invention result in the production of flexible PU foam, such as a flexible PU foam blocks or foam having any polygonal shape, having dimensions that are more accurately predicted, thereby reducing waste of material and processing time when providing foam to be cut into final or intermediate products having precise predetermined dimensions.

PU foams (polyurethane foams) and the production thereof are well known to those skilled in the art and, per se, require no further elucidation. Shaped articles in the context of the present disclosure are shaped bodies of different shape. Preferred shapes in the context of embodiments of the invention are, for example, geometries such as spheres, cuboids, cylinders etc. Shaped PU foam articles in the context of the present disclosure are thus shaped bodies made of polyurethane foam. Particularly preferred shaped hot-cure flexible PU foam articles in the context of the present disclosure are mattresses and/or cushions and also foam blocks in general. Other flexible foam articles covered by the scope of embodiments of the present disclosure include, but are not limited to, foams used in the manufacture of, or used as accessories to, shoes (e.g., pads and soles), sofas, bedding, brassieres, clothes (e.g., shoulder pads), air filters (e.g., filter foams) and vehicles (e.g., laminates, including foam layers, used in the manufacture of vehicle roofs/ceilings, dashboards, or foam used in seats and/or other automotive components).

The production of polyurethane foam in general is known per se. It is formed by the tried and tested reaction of at least one polyol component and at least one isocyanate component in the presence of at least one blowing agent (e.g., water) in a polyaddition reaction.

The polyurethane foam according to embodiments of the present disclosure is flexible polyurethane foam. The foam is made by a continuous process (also called slabstock foaming process) using data (e.g., rise profile data) obtained from a discontinuous lab-produced foam-forming process. Flexible foam is typically used for comfort applications like sofas, cushions or mattresses. Other technical applications for flexible foam include filter foam or flame lamination foam. Also, applications in the textile and apparel industry are known (e.g., shoulder pads, brassieres).

Rigid polyurethane foam is used for insulation applications like refrigerators or insulation boards. Rigid PU foams that are inelastic and usually have closed cells, are used for insulation purposes and are not a focus of embodiments of the present disclosure. Flexible PU foams are elastic and deformable and usually have open cells. As a result, the air can escape easily on compression.

There exists a wide variety of flexible PU foams. For instance, the person skilled in the art is aware inter alia of ester foams (made from polyester polyols), flexible hot-cure PU foams and cold-cure PU foams. Viscoelastic flexible PU foams are a relatively new type which is counted among the hot-cure flexible PU foams. In the context of the present disclosure, all flexible foam types are included. The crucial difference between a hot-cure flexible PU foam and a cold-cure PU foam lies in the different mechanical properties. It is possible to differentiate between flexible hot-cure PU foams and flexible cold-cure PU foams via rebound resilience in particular, also called ball rebound (BR) or resilience. A method of determining the rebound resilience is described, for example, in DIN EN ISO 8307:2008-03. Here, a steel ball having a fixed mass is allowed to fall from a particular height onto the test specimen and the height of the rebound in % of the fall height is then measured. The values in question for a cold-cure flexible PU foam are preferably in the region of >50%. Cold-cure flexible PU foams are therefore also often referred to as HR foams (HR: High Resilience). By contrast, hot-cure flexible PU foams have rebound values of preferably 1% to not more than 50%. In the context of preferred embodiments of the present invention, the hot-cure flexible PU foams according to the present disclosure therefore have rebound values of preferably 1% to not more than 50%, determinable in accordance with DIN EN ISO 8307:2008-03.

A further mechanical criterion is the SAG or comfort factor. In this case, a foam sample is compressed in accordance with DIN EN ISO 2439 and the ratio of compressive stress at 65% and 25% compression is measured. Cold-cure flexible PU foams here have a SAG or comfort factor of preferably >2.5. Hot-cure flexible PU foams have a value of preferably <2.5. In preferred embodiments of the present invention, the hot-cure flexible PU foams according to the present disclosure therefore have a SAG or comfort factor of preferably <2.5, determinable as specified above.

An exact definition of the properties can also be taken, for example, from the data sheet "PUR-Kaltschaum" [Cold-Cure PU Foam] from the Fachverband Schaumkunststoffe und Polyurethane e. V. [Specialist Association Foamed Plastics and Polyurethanes], Reference KAL20160323, last update 23.03.2016. (for example, see https://www.fsk-vsv.de/wp-content/uploads/2017/03/Produktbeschreibung-PUR-Kaltschaum.pdf). This data sheet can also be ordered directly from the Fachverband Schaumkunststoffe und Polyurethane e. V. (FSK), postal address: Stammheimerstr. 35, D-70435 Stuttgart.

The two names hot-cure flexible PU foam and cold-cure flexible PU foam are explained by the historical development of PU technology, and do not necessarily mean that different temperatures occur in the foaming process.

The different mechanical properties of hot-cure PU foams and cold-cure PU foams result from differences in the formulation for production of the foams. In the case of a cold-cure flexible PU foam, predominantly high-reactivity polyols having primary OH groups and average molar mass >4000 g/mol are usually used. Optionally, low molecular weight crosslinkers are also used, and it is also possible for the function of the crosslinker to be assumed by higher-functionality isocyanates. In the case of hot-cure flexible PU foams, comparatively predominantly unreactive polyols having secondary OH groups and an average molar mass of <4000 g/mol are usually used. In the case of cold-cure flexible PU foams, reaction of the isocyanate groups with the hydroxyl groups thus occurs to a higher share as early as in the expansion phase ($CO_2$ formation from —NCO and $H_2O$) of the foam. This rapid polyurethane reaction usually leads, as a result of a viscosity increase, to a relatively high intrinsic stability of the foam during the blowing process. As a result, other foam stabilizers with different siloxane structures compared to hot-cure flexible PU foams are required. Cold-cure flexible PU foams are usually highly elastic foams. Due to the high intrinsic stability, the cells have generally not been opened sufficiently at the end of the foaming operation and the cell structure additionally has to be open by mechanical crushing. In the case of hot-cure flexible PU foams, by contrast, this is not normally necessary. Significantly greater stabilization by high molecular weight polyethersiloxane structures is important here.

Open-cell hot-cure flexible PU foams preferably have a gas permeability (also called "porosity") within a range from 1 to 6.5 scfm. This is measured by applying a pressure differential and measuring the volume of air that flows through in accordance with ASTM D 3574 (2011-00). The method is elucidated in detail further below (i.e., see subsection (f) discussed in the Methods for characterization of PU foam samples). Scfm (standard cubic feet per minute) is measured under standard conditions (23° C., 100 kPa).

Depending on the application, hot-cure flexible PU foams preferably have a foam density between 8 and 80 kg/m$^3$. Especially when such hot-cure flexible PU foams are used as mattresses, mattress constituents and/or cushions, said foams are differentiated according to regional wants and needs, requirements and preferences of consumers. The preferred hot-cure flexible PU foam for mattress applications has a foam density of preferably 25-30 kg/m$^3$.

A specific class of hot-cure flexible PU foams is that of viscoelastic PU foams. These are also known as "memory foam" and exhibit both a low rebound resilience (preferably <10%) and a slow, gradual recovery after compression (recovery time preferably 2-10 s). Materials of this kind are well known in the prior art and are highly valued for, in particular, their energy- and sound-absorbing properties too.

Typical viscoelastic flexible foams usually have a lower porosity and a high density (or a high foam density (FD)) compared to other hot-cure flexible PU foams. Cushions have a foam density of preferably 30-50 kg/m³ and are thus at the lower end of the density scale typical of viscoelastic foams, whereas viscoelastic PU foams for mattresses preferably have a density in the range of 45-130 kg/m³.

In hot-cure flexible PU foams, the hard and soft segments become oriented relative to one another during the reaction and then spontaneously separate from one another to form morphologically different phases within the "bulk polymer". Such materials are also referred to as "phase-separated" materials. The glass transition temperature in the case of viscoelastic foams is preferably between −20 and +15° C. The glass transition temperature of other hot-cure flexible PU foams and cold-cure flexible PU foams, by contrast, is usually below −35° C. Such "structural viscoelasticity" in the case of open-cell viscoelastic hot-cure flexible PU foams which is based essentially on the glass transition temperature of the polymer should be distinguished from a pneumatic effect. In the latter case, the cell structure is relatively closed (low porosity). As a result of the low air permeability, the air flows back in only gradually after compression, which results in slowed recovery.

Various hot-cure flexible PU foams are classified not only according to foam density but often also according to their compressive strength, also referred to as load-bearing capacity, for particular applications. For instance, compressive strength CLD (compression load deflection), 40% in accordance with DIN EN ISO 3386-1:2015-10, for hot-cure flexible PU foams is preferably in the range of 2.0-8.0 kPa; viscoelastic polyurethane foams preferably have values of 0.1-5.0 kPa, especially 0.5-3.0 kPa.

Hot-cure flexible PU foams and production thereof are known per se. In a preferred embodiment of the present invention, a hot-cure flexible PU foam has a compressive strength CLD, 40% in accordance with DIN EN ISO 3386-1:2015-10, of 2.0-8.0 kPa and/or a rebound resilience of 1-50%, measured in accordance with DIN EN ISO 8307:2008-03, and/or a foam density of 8 to 80 kg/m³ and/or a porosity of 1 to 6 scfm, especially 1.5 to 4.5 scfm, more preferably 1.75 to 4.25 scfm. A possible production method is described, for example, in EP 2 481 770 A2 or EP 2 182 020 A1. For the purposes of the present disclosure, in a preferred embodiment of the invention, the viscoelastic flexible PU foam has a glass transition temperature between −20° C. and +15° C. and/or a compressive strength CLD, 40% in accordance with DIN EN ISO 3386-1:2015-10, of 0.1-5.0 kPa, especially 0.5-2.5 kPa, and/or a rebound resilience of <10%, measured in accordance with DIN EN ISO 8307:2008-03, and/or a foam density of 30 to 130 kg/m³ and/or a porosity (after crushing the foam) of 1 to 6 scfm, especially 1.5 to 4.5 scfm, more preferably 1.75 to 4.25 scfm. A possible method of production is described, for example, in WO 2013/131710 A2. The glass transition temperature can be measured by means of dynamic mechanical analysis (DMA) (DIN 53513:1990-03) or by means of differential calorimetry (DSC) (ISO 11357-2:2013). Strictly speaking, it is a glass transition range which extends over a temperature range. Values reported are therefore averages.

According to a preferred embodiment of the present invention, a shaped hot-cure flexible PU foam article (e.g., foam to be used as a mattress or the mattress produced by the foam process of the present disclosure), has a height of at least 1 cm to not more than 50 cm and a width of from at least 20 cm to not more than 300 cm, and a length of at least 20 cm to not more than 300 cm. Preferred dimensions are, for example, heights in the range from 5 cm to 40 cm, widths in the range from 70 cm to 200 cm, lengths in the range from 150 cm to 220 cm. According to another preferred embodiment of the present invention, a shaped PU foam article (e.g., a cushion), has a height of at least 1 cm to not more than 40 cm and a width of at least 15 cm to not more than 200 cm and a length of at least 15 cm to not more than 200 cm, examples of preferred dimensions being heights in the range from 2 cm to 30 cm, widths in the range from 15 cm to 50 cm, lengths in the range from 15 cm to 50 cm.

In a further preferred embodiment of the invention, the shaped flexible PU foam article may also be a cold-cure PU foam mattress, a viscoelastic flexible PU foam mattress, a hot-cure flexible PU foam mattress, a PU gel foam mattress, a latex mattress or a box spring mattress, each containing at least a portion made of a hot-cure flexible PU foam or cold-cure flexible foam according to embodiments of the invention. These types of mattress are known per se to those skilled in the art and are also marketed worldwide under these names. Mattresses made solely of hot-cure flexible PU foam are usually referred to on the market simply as foam mattresses. The term mattress as used for the purposes of the invention also encompasses corresponding mattress coverings and underlays.

The provision of the various flexible PU foams is that they are made by a continuous slabstock process. Discontinuous processes like box foaming or foaming into a mold (molded PU foam) are not a focus of embodiments of the present disclosure. In the continuous production process of flexible PU foam the expansion of the foam is possible in a rectangular direction to the movement of the foam or the reaction mixture. The gas pressure in the expanding foam is therefore approximately equivalent to the gas pressure against which the rising foam is expanding. This is in contrast to molded foaming in which case a significant over pressure is reached in the mold versus the outside while foaming. The movement of the expanding foam is usually in a horizontal direction forced by a conveyor (e.g., a conveyor belt). In some rare cases also a movement in a vertical direction is possible.

The production of corresponding hot-cure flexible PU foams in principle requires no further explanation, but some preferred details of the production of the PU foam used for explanatory purposes of embodiments of the invention are given below. The subject matter of the invention will be described by way of example below, without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless stated otherwise, percentages are figures in percent by weight. When average values are reported below, the values in question are weight averages, unless stated otherwise. Where parameters which have been determined by measurement are reported below, the measurements have been carried out at a temperature of 23° C. and a pressure of 100 kPa, unless stated otherwise.

For the purposes of the present invention, polyurethanes are all reaction products derived from isocyanates, in particular polyisocyanates, and appropriately isocyanate-reactive molecules, including polyisocyanurates, polyureas, and allophanate-, biuret-, uretdione-, uretonimine- or carbodiimide-containing isocyanate or polyisocyanate reaction products. It will be apparent that a person skilled in the art seeking to produce the different flexible polyurethane foam types, for example hot-cure flexible PU foams, will appropriately select the substances necessary for each respective purpose, such as isocyanates, polyols, stabilizers, surfactants, etc., in order to obtain the polyurethane type, especially polyurethane foam type, desired in each case. Further details of the usable starting materials, catalysts and auxiliaries and additives can be found, for example, in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives which follow are mentioned merely by way of example and can be replaced and/or supplemented by other substances known to those skilled in the art.

The isocyanate components used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. Generally, it is possible to use all aliphatic, cycloaliphatic, arylaliphatic and preferably aromatic polyfunctional isocyanates known per se. Isocyanates are preferably used in a range from 60 to 350 mol %, more preferably in a range from 60 to 140 mol %, relative to the sum total of the isocyanate-consuming components.

Specific examples are alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates can be used individually or in the form of mixtures thereof.

It is also possible to use isocyanates which have been modified by the incorporation of urethane, uretdione, isocyanurate, allophanate and other groups, called modified isocyanates.

Particularly suitable organic polyisocyanates which are therefore used with particular preference are various isomers of tolylene diisocyanate (tolylene 2,4- and 2,6-diisocyanate (TDI), in pure form or as isomer mixtures of various composition), diphenylmethane 4,4'-diisocyanate (MDI), "crude MDI" or "polymeric MDI" (contains the 4,4' isomer and also the 2,4' and 2,2' isomers of MDI and products having more than two rings) and also the two-ring product which is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Polyols suitable as polyol component for the purposes of the present invention are all organic substances having two or more isocyanate-reactive groups, preferably OH groups, and also formulations thereof. Preferred polyols are all polyether polyols and/or hydroxyl-containing aliphatic polycarbonates which are customarily used for producing polyurethane systems, in particular polyurethane foams, in particular polyether polycarbonate polyols and/or filled polyols (polymer polyols) such as SAN, PHD and PIPA polyols which contain solid organic fillers up to a solids content of 40% or more in dispersed form, and/or autocatalytic polyols which contain catalytically active functional groups, in particular amino groups, and/or polyols of natural origin, known as "natural oil-based polyols" (NOPs). The polyols for hot-cure flexible PU foam preferably have a functionality of 1.8 to 8 and number-average molecular weights in the range from 500 to 4000 g/mol. The polyols having OH numbers in the range from 25 to 400 mg KOH/g are typically used. The number-average molecular weights are typically determined by gel permeation chromatography (GPC), especially using polypropylene glycol as reference substance and tetrahydrofuran (THF) as eluent. The OH numbers can be determined, in particular, in accordance with the DIN standard DIN 53240:1971-12. Depending on the required properties of the resulting foams, it is possible to use appropriate polyols, as described for example in: US 2007/0072951 A1, WO 2007/111828, US 2007/0238800, U.S. Pat. No. 6,359,022 or WO 96/12759. Further polyols are known to those skilled in the art and can be found, for example, in EP-A-0380993 or U.S. Pat. No. 3,346,557.

In a preferred embodiment of the invention, especially for production of flexible slabstock foam, polyether alcohols having secondary hydroxyl groups in amounts of preferably above 50%, more preferably above 90%, are used, especially those having a propylene oxide block or random propylene oxide and ethylene oxide block at the chain end, or those based solely on propylene oxide blocks. Such polyether alcohols preferably have a functionality of 2 to 8, more preferably 2 to 4, number-average molecular weights in the range from 500 to 4000 g/mol, preferably 800 to 4000 g/mol, more preferably 2500 to 4000 g/mol, and typically OH numbers in the range from 20 to 100 mg KOH/g, preferably 40 to 60 mg KOH/g.

In a further preferred embodiment of the invention, di- and/or trifunctional polyether alcohols comprising primary hydroxyl groups in amounts of preferably above 50%, more preferably above 80%, in particular those having an ethylene oxide block at the chain end, are additionally also used. Polyols for cold-cure flexible PU foams ("HR polyols") form part of this category if the molar mass is simultaneously >4000 g/mol. According to the required properties of this embodiment, which is preferred in accordance with embodiments of the invention, especially for production of the abovementioned hot-cure flexible PU foams, preference is given to using not only the polyether alcohols described here but also further polyether alcohols which bear primary hydroxyl groups and are based predominantly on ethylene oxide, in particular having a proportion of ethylene oxide blocks of >70%, preferably >90% ("hypersoft polyol"). All polyether alcohols described in the context of this preferred embodiment preferably have a functionality of 2 to 8, more preferably 2 to 5, number-average molecular weights in the range from 500 to 8000 g/mol, preferably 500 to 7000 g/mol, and typically OH numbers in the range from 5 to 100 mg KOH/g, preferably 20 to 60 mg KOH/g. Polyols having primary OH functions are used here in the case of the hot-cure flexible PU foams of the invention, in a preferred embodiment, not alone but rather in combination with polyols having secondary OH groups.

In a further preferred embodiment of the invention, autocatalytic polyols are used.

In a further preferred embodiment of the invention, especially for production of viscoelastic flexible PU foams, preference is given to using mixtures of various, preferably two or three, polyfunctional polyether alcohols. The polyol combinations used here typically consist of a low molecular weight "crosslinker" polyol having high functionality, preferably having an OH number of from 100 to 400 mg KOH/g, and/or a conventional high molecular weight flexible slabstock foam polyol or HR polyol and/or a "hypersoft" polyether polyol, preferably having an OH number of 20 to 40 mg KOH/g, with a high proportion of ethylene oxide and having cell-opening properties. If HR polyols are also used in the viscoelastic foam formulation, the proportion by mass thereof in the polyol mixture is <50%.

Polyester polyols were the first polyols used in the beginning of PU development, and are produced by polycondensation of a diacid with excess diol. Difunctional monomers are used to obtain a linear polymer. Addition of small amounts of multifunctional starters with functionality larger than two as trimethylol propane and glycerin could be used to generate polymers with an average functionality higher than two. The most used acids are adipic acid and phthalic acid. Adipic acid based polyester polyols are used in applications where flexibility is wanted, as in flexible polyurethane foams. Phthalic acids (or phthalic anhydride) based polyols, have rigid chains and are used in rigid foams and in high performance coatings. For flexible PU foam aliphatic polyester polyols are often used based typically on adipic acid, diethylene glycol and trimethylol propane or glycerine to induce a higher functionality. The average molecular weight is typically 2000-3000 g/mol and the OH number 57-63 mg KOH/g.

In the polyester polyols production process, the diol, triol, etc. is first heated to a temperature of 60-90° C. Then the dicarboxylic acid is added, and removal of the reaction water begins. For obtaining the targeted molecular weight the excess diol is calculated by means of Flory Equation. Usually, the reaction is completed at temperatures up to 200° C. Nitrogen, carbon dioxide, or vacuum is used to remove the water and to reach the wanted conversion of 99.9%, and the resulting polyester should have an acid number less than two. This conversion is necessary to minimize the presence of residual carboxylic end groups that can reduce the reactivity. The polyesters are composed of all possible oligomers ranging from the monomers to high molecular weight species. Usually, aliphatic polyester polyols used in flexible polyurethanes are based on polyadipates diols such as ethylene glycol, diethylene glycol, propylene glycol, 1,4-butane diol, 1,6-hexane diol, etc. The growth of the diol chain results in greater PU flexibility and hydrolytic stability and reduction of polarity and glass transition temperature. Lightly branched poly (diethyleneglycol adipates), which are used mainly to make flexible foams, and a wide range of adipates made with more than one aliphatic diol.

These are used to make solid and microcellular elastomers, flexible coatings and adhesives. Relatively low cost polyester polyols, based on recovery materials from recycling processes are also available. Mixed adipic, glutaric and succinic acid polyesters are made using purified nylon waste acids. In comparison with PU based polyether polyols, the PU based polyesters are more resistant to oil, grease, solvents and oxidation. They possess better properties related to tension and tear strength, flex fatigue, abrasion, adhesion and dimensional stability. On the other hand, PU based esters are more sensitive to hydrolysis and microbiological attack. The production process of flexible polyurethane foam based on polyester polyols follows the same principles as polyether polyol based polyurethane flexible foam. The machinery is therefore also equivalent. According to embodiments of the present invention, the simulation of the production process could be derived from laboratory rise profiles in the same way as for flexible PU foam based on polyether polyols. Often PU flexible foams based on polyester polyols are called just "Polyester foams". It is also possible to combine in flexible PU foam formulations polyether and polyester polyols. Such foams are often called "hybrid foams". All those foams are within the scope of the present inventions as long as they are produced by a continuous production process.

In a further preferred embodiment of the invention, recycled polyols are used. Recycled polyols are polyols that are obtained from PU foam waste. This may be production waste from hot-cure flexible PU foam production or from hot-cure flexible PU foam waste after use by the consumer (for example old mattresses). In both cases, PU foam is liquefied by chemical processes. Various processes are useful here, for example, glycolysis, hydrolysis or acidolysis. The liquid recycled polyol obtained can then be reused for production of hot-cure flexible PU foam. However, such hot-cure flexible PU foams often feature distinctly adverse mechanical properties, such as resistance to roll compression. One source for further information on the use of recycled polyols in hot-cure flexible PU foams is the following BMBF research report: https://www.cleaner-production.de/fileadmin/assets/bilder/BMBF-Projekte/01RI05070-075_-_Abschlussbericht.pdf.

The additional use of recycled polyols in the context of the invention corresponds to a preferred embodiment of the invention for each item of subject-matter described herein.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 50 to 140, preferably 70 to 130, more preferably 85 to 125. An index of 100 represents a molar reactive group ratio of 1:1.

The flexible PU foams according to embodiments of the invention can also be produced using catalysts. The expression "catalysts", for the purposes of the present invention, includes all compounds known from the prior art which are able to catalyze isocyanate reactions and/or are used as catalysts, cocatalysts or activators in the production of polyisocyanate reaction products, in particular polyurethane foams.

Suitable catalysts are known; these are especially substances that catalyze the gel reaction (isocyanate-polyol), the blowing reaction (isocyanate-water) and/or the di- or trimerization of the isocyanate. Such catalysts are preferably nitrogen compounds, especially amines and ammonium salts, and/or metal compounds.

Examples of suitable nitrogen compounds as catalysts for the purposes of the present invention are the amines triethylamine, triethanolamine, diethanolamine, N,N-dimethylcyclohexylamine, N,N-dicyclohexylmethylamine, N,N-dimethylaminoethylamine, N,N,N',N'-tetramethylethane-1,2-diamine, N,N,N',N'-tetramethylpropane-1,3-diamine, N,N, N',N'-tetramethylbutane-1,4-diamine, N,N,N',N'-tetramethylhexane-1,6-diamine, N-[2-(dimethylamino) ethyl]-N,N',N'-trimethylethane-1,2-diamine, 2-[(2-(dimethylamino)ethyl) methylamino]ethanol, N',N'-dimethylpropane-1,3-diamine, N',N'-diethylpropane-1,3-diamine, 1-(2-aminoethyl)pyrrolidine, 1-(3-aminopropyl) pyrrolidine, 1-[3-(dimethylamino)propyl-(2-hydroxypropyl) amino]propan-2-ol, 2-[[3-(dimethylamino)propyl] methylamino]ethanol, 3-(2-dimethylamino)ethoxy)propylamine, N-[3-(dimethylamino)propyl]-N',N'-dimethylpropane-1,3-diamine, N'-[3-(dimethylamino)propyl]-N,N,N'-trimethylpropane-1,3-diamine, 1-[bis [3-(dimethylamino)propyl]amino]-2-propanol, N,N-bis [3-(dimethylamino) propyl]-N',N'-dimethylpropane-1,3-diamine, 1,4-diazabicyclo[2.2.2] octane, 1,4-diazabicyclo[2.2.2]octane-2-methanol, 1,2-dimethylimidazole, N-(2-hydroxypropyl) imidazole, 2-methyl-1-(2-methylpropyl) imidazole, N-(3-aminopropyl) imidazole, N-methylimidazole, 1-(3-aminopropyl)-2-methyl-1H-imidazole, N-ethylmorpholine, N-methylmorpholine, 2,2,4-trimethyl-2-silamorpholine, N-ethyl-2,2-dimethyl-2-silamorpholine, N-(2-aminoethyl) morpholine, N-(2-hydroxyethyl) morpholine, 2,2'-dimorpholinodiethyl ether, N,N'-dimethylpiperazine, N-(2-hydroxyethyl) piperazine, N-(2-aminoethyl) piperazine, N,N-dimethylbenzylamine, N,N-(dimethylamino)ethanol, N,N-(diethylamino)ethanol, 1-(2-hydroxyethyl)pyrrolidine, 3-dimethylamino-1-propanol, 1-(3-hydroxypropyl)pyrrolidine, 2-[2-(dimethylamino)ethoxy]ethanol, 2-[2-(diethylamino)ethoxy]ethanol, bis(2-dimethylaminoethyl)ether, 2-[[2-(2-(dimethylamino)ethoxy)ethyl]methylamino]ethanol, N-[2-[2-(dimethylamino)ethoxy]ethyl]-N-methylpropane-1,3-diamine, 1,3,5-tris [3-(dimethylamino)propyl] hexahydro-1,3,5-triazine, 1,8-diazabicyclo[5.4.0]undec-7-ene, 1,5-diazabicyclo[4.3.0]non-5-ene, 1,5,7-triazabicyclo [4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, 2-tert-butyl-1,1,3,3-tetramethylguanidine, guanidine, 1,1'-[(3-{bis [3-(dimethylamino)propyl]amino}propyl) imino] dipropan-2-ol, (3-aminopropyl) bis [3-(dimethylamino)propyl]amine, 3-(dimethylamino)propylurea, 1,3-bis [3-(dimethylamino) propyl]urea, 3-dimethylamino-N,N-dimethylpropanamide, 6-(dimethylamino) hexan-1-ol and 2,4,6-tris [(dimethylamino) methyl] phenol.

Catalysts and/or mixtures of this kind are supplied commercially, for example, under the Jeffcat® ZF-10, Lupragen® DMEA, Lupragen® API, Toyocat® RX 20 and Toyocat® RX 21, DABCOR RP 202, DABCO® RP 204, DABCOR NE 300, DABCOR NE 310, DABCO® NE 400, DABCOR NE 500, DABCOR NE 600, DABCOR NE 650, DABCO® NE 660, DABCOR NE 740, DABCOR NE 750, DABCOR NE 1060, DABCOR NE 1080, DABCOR NE 1082 and DABCOR NE 2039, Niax® EF 860, Niax® EF 890, Niax® EF 700, Niax® EF 705, Niax® EF 708, Niax® EF 600, Niax® EF 602, Kosmos® 54, Kosmos® EF, and Tegoamin® ZE 1 names.

Suitable metal compounds as catalysts may be selected, for example, from the group consisting of metal-organic or organometallic compounds, metal-organic or organometallic salts, organic metal salts, inorganic metal salts and from the group consisting of charged or uncharged metal-containing coordination compounds, in particular metal chelate complexes. The expression "metal-organic or organometallic compounds" in the context of embodiments of this invention especially encompasses the use of metal compounds having a direct carbon-metal bond, also referred to here as metal organyls (e.g., tin organyls) or organometallic compounds (e.g. organotin compounds). The expression "organometallic or metal-organic salts" in the context of embodiments of this invention especially encompasses the use of metal-organic or organometallic compounds having salt character, i.e. ionic compounds in which either the anion or cation is metal-organic in nature (e.g. organotin oxides, organotin chlorides or organotin carboxylates). The expression "organic metal salts" in the context of embodiments of this invention especially encompasses the use of metal compounds which do not have any direct carbon-metal bond and are simultaneously metal salts, in which either the anion or the cation is an organic compound (e.g. tin (II) carboxylates). The expression "inorganic metal salts" in the context of embodiments of this invention especially encompasses the use of metal compounds or of metal salts in which neither the anion nor the cation is an organic compound, e.g. metal chlorides (e.g. tin (II) chloride), pure metal oxides (e.g. tin oxides) or mixed metal oxides, i.e. containing a plurality of metals, and/or metal silicates or aluminosilicates. The expression "coordination compound" in the context of embodiments of this invention especially encompasses the use of metal compounds formed from one or more central particles and one or more ligands, the central particles being charged or uncharged metals (e.g. metal- or tin-amine complexes). The expression "metal-chelate complexes" in the context of embodiments of this invention especially encompasses the use of metal coordination compounds which have ligands having at least two coordination or bonding positions to the metal center (e.g. metal- or tin-polyamine or metal- or tin-polyether complexes). Suitable metal compounds, especially as defined above, as catalysts in embodiments of the present invention may be selected, for example, from all metal compounds comprising lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead, and/or bismuth, especially sodium, potassium, magnesium, calcium, titanium, zirconium, molybdenum, tungsten, zinc, aluminium, tin and/or bismuth, more preferably tin, bismuth, zinc and/or potassium.

Suitable metal-containing coordination compounds include, for example, any metal acetylacetonates such as nickel (II) acetylacetonate, zinc (II) acetylacetonate, copper (II) acetylacetonate, molybdenum dioxoacetylacetonate, any iron acetylacetonates, any cobalt acetylacetonates, any zirconium acetylacetonates, any titanium acetylacetonates, any bismuth acetylacetonates and any tin acetylacetonates. Particularly suitable metal-organic salts and organic metal salts, particularly as defined above, as catalysts in the context of the present invention, are, for example, organotin, tin, zinc, bismuth and potassium salts, especially corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis-n-laurylmercaptide, dimethyltin bis-n-laurylmercaptide, monomethyltin tris-2-ethylhexylmercaptoacetate, dimethyltin bis-2-ethylhexylmercaptoacetate, dibutyltin bis-2-ethylhexylmercaptoacetate, dioctyltin bisisooctylmercaptoacetate, tin (II) acetate, tin (II) 2-ethylhexanoate (tin (II) octoate), tin (II) isononanoate (tin (II) 3,5,5-trimethylhexanoate), tin (II) neodecanoate, tin (II) ricinoleate, zinc (II) acetate, zinc (II) 2-ethylhexanoate (zinc (II) octoate), zinc (II) isononanoate (zinc (II) 3,5,5-trimethylhexanoate), zinc (II) neodecanoate, zinc (II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate. Suitable metallic catalysts are generally selected with preference such that they do not have any inherent nuisance odor, are substantially unobjectionable toxicologically, and endow the resultant polyurethane systems, especially polyurethane foams, with as low a level of catalyst-induced emissions as possible.

Aside from amines and metal compounds, it is also possible to use ammonium salts as catalysts. Suitable examples are ammonium formate and/or ammonium acetate.

Suitable catalysts are mentioned, for example, in DE 102007046860, EP 1985642, EP 1985644, EP 1977825, US 2008/0234402, EP 0656382 B1 and US 2007/0282026 A1, and the patent documents cited therein.

Suitable use amounts of catalysts are guided by the type of catalyst and are preferably in the range from 0.01 to 10.0 pphp, more preferably in the range from 0.02 to 5.00 pphp (=parts by weight based on 100 parts by weight of polyol).

Optional additives used may be all substances which are known according to the prior art and find use in the production of polyurethanes, especially of flexible PU foams, for example blowing agents, preferably water for formation of $CO_2$, and, if necessary, further physical blowing agents, crosslinkers and chain extenders, stabilizers against oxidative degradation (called antioxidants), flame retardants, surfactants, biocides, cell-refining additives, cell openers, solid fillers, antistatic additives, nucleating agents, thickeners, dyes, pigments, colour pastes, fragrances, emulsifiers, buffer substances and/or catalytically active substances, especially as defined above.

Water is generally used as the blowing agent in the production of flexible PU foams. Preference is given to using such an amount of water that the water concentration is from 0.10 to 10.0 pphp (pphp=parts by weight based on 100 parts by weight of polyol).

It is also possible to use suitable physical blowing agents. These are, for example, liquefied $CO_2$ and volatile liquids, for example hydrocarbons having 3, 4 or 5 carbon atoms, preferably cyclopentane, isopentane and n-pentane, oxygen-containing compounds such as methyl formate, acetone and dimethoxymethane, or chlorinated hydrocarbons, preferably dichloromethane and 1,2-dichloroethane.

Apart from water and the physical blowing agents, it is also possible to use other chemical blowing agents which react with isocyanates to evolve a gas, for example formic acid. Optional crosslinkers and optional chain extenders are low molecular weight, polyfunctional compounds which are reactive toward isocyanates. Suitable compounds are, for example, hydroxyl- or amine-terminated substances such as glycerol, neopentyl glycol, 2-methyl-1,3-propanediol, triethanolamine (TEOA), diethanolamine (DEOA) and trimethylolpropane. The use concentration is usually in the range from 0.1 to 5 parts, based on 100 parts of polyol, but can also deviate therefrom depending on the formulation.

Suitable optional stabilizers against oxidative degradation, so-called antioxidants, preferably include all commonly used free-radical scavengers, peroxide scavengers, UV absorbers, light stabilizers, complexing agents for metal ion contaminants (metal deactivators). Preference is given to using compounds of the following classes of substances, or classes of substances containing the following functional groups, with substituents on the respective parent molecules preferably being, in particular, substituents which have groups which are reactive toward isocyanate: 2-(2'-hydroxyphenyl) benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamine, alkyl and aryl phosphites, sulfides, zinc carboxylates, diketones.

Suitable optional flame retardants in the context of embodiments of this invention are all substances which are regarded as suitable for this purpose according to the prior art. Preferred flame retardants are, for example, liquid organophosphorus compounds such as halogen-free organophosphates, e.g. triethyl phosphate (TEP), halogenated phosphates, for example tris(1-chloro-2-propyl) phosphate (TCPP) and tris(2-chloroethyl) phosphate (TCEP), and organic phosphonates, for example dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

For stabilization of the rising foam mixture and for influencing of the foam properties of polyurethane foams, organomodified siloxanes are usually used in the production of hot-cure flexible PU foams. (Organomodified) siloxanes suitable for this purpose are described for example in the following documents: EP 0839852, EP 1544235, DE 102004001408, EP 0839852, WO 2005/118668, US20070072951, DE 2533074, EP 1537159, EP 533202, U.S. Pat. No. 3,933,695, EP 0780414, DE 4239054, DE 4229402, EP 867465. These compounds may be prepared as described in the prior art. Suitable examples are described, for instance, in U.S. Pat. No. 4,147,847, EP 0493836 and U.S. Pat. No. 4,855,379. Foam stabilizers for hot-cure flexible PU foams are characterized by large siloxane structures having more than 50 Si units and pendant polyethers. These foam stabilizers are also referred to as polydialkylsiloxane-polyoxyalkylene copolymers. The structure of these compounds is preferably such that, for example, a long-chain copolymer of ethylene oxide and propylene oxide is bonded to a polydimethylsiloxane radical. The linkage between the polydialkylsiloxane and the polyether moiety may be via an SiC linkage or an Si—O—C bond. In structural terms, the polyether or the different polyethers may be bonded to the polydialkylsiloxane in terminal or lateral positions. The alkyl radical of the siloxane may be aliphatic, cycloaliphatic or aromatic. Methyl groups are very particularly advantageous. The organomodified polydialkylsiloxane may be linear or else contain branches. Suitable stabilizers, especially foam stabilizers, are described inter alia in U.S. Pat. Nos. 2,834,748, 2,917,480 and in U.S. Pat. No. 3,629,308. The function of the foam stabilizer is to assure the stability of the foaming reaction mixture. The contribution to foam stabilization correlates here with siloxane chain length. Without foam stabilizer, a collapse is observed, and hence no homogeneous foam is obtained. In the case of some flexible PU foam types that have higher stability and hence a lower tendency to collapse, it is also possible to use low molecular weight polyethersiloxanes. These then have siloxane chain lengths much shorter than 50. For instance, in the case of cold-cure flexible PU foams or flexible foams based on polyester polyols, unmodified or modified short-chain siloxanes are used. When long-chain and hence more potent siloxane stabilizers are used, by contrast, over-stabilization and hence shrinkage after foam production is observed in such foam types. Foam stabilizers may in principle be selected as desired in the context of embodiments of the present invention.

The compounds above can, for example, be used together with suitable solvents and/or further additives. As optional solvents, it is possible to employ all suitable substances known from the prior art. Depending on the application, it is possible to use aprotic nonpolar, aprotic polar and protic solvents. Suitable aprotic nonpolar solvents can, for example, be selected from the following classes of substances, or classes of substances containing the following functional groups: aromatic hydrocarbons, aliphatic hydrocarbons (alkanes (paraffins) and olefins), carboxylic esters (e.g. isopropyl myristate, propylene glycol dioleate, decyl cocoate or other esters of fatty acids) and polyesters, (poly) ethers and/or halogenated hydrocarbons having a low polarity. Suitable aprotic polar solvents can, for example, be selected from the following classes of substances, or classes of substances containing the following functional groups: ketones, lactones, lactams, nitriles, carboxamides, sulfoxides and/or sulfones. Suitable protic solvents can, for example, be selected from the following classes of substances, or classes of substances containing the following functional groups: alcohols, polyols, (poly) alkylene glycols, amines, carboxylic acids, in particular fatty acids and/or primary and secondary amides. Particular preference is given to solvents which are readily employable in the foaming operation and do not adversely affect the properties of the foam. For example, isocyanate-reactive compounds are suitable, since they are incorporated into the polymer matrix by reaction and do not generate any emissions in the foam. Examples are OH-functional compounds such as (poly) alkylene glycols, preferably monoethylene glycol (MEG or EG), diethylene glycol (DEG), triethylene glycol (TEG), 1,2-propylene glycol (PG), dipropylene glycol (DPG), trimethylene glycol (propane-1,3-diol, PDO), tetramethylene glycol (butanediol, BDO), butyl diglycol (BDG), neopentyl glycol, 2-methylpropane-1,3-diol (Ortegol CXT) and higher homologues thereof, for example polyethylene glycol (PEG) having average molecular masses between 200 g/mol and 3000 g/mol. Particularly preferred OH-functional compounds further include polyethers having average molecular masses of 200 g/mol to 4500 g/mol, especially 400 g/mol to 2000 g/mol, among these preferably water-, allyl-, butyl- or nonyl-initiated polyethers, in particular those which are based on propylene oxide (PO) and/or ethylene oxide (EO) blocks.

It can be advantageous in the production of flexible PU foam to produce and/or use a composition which comprises at least one polyol component, optionally at least one isocyanate component and optionally one or more blowing agents and to react this composition.

The flexible PU foams according to embodiments of the invention can be produced by any continuous methods familiar to the person skilled in the art, for example by low-pressure or high-pressure foaming machines. The term high pressure or low pressure refers to the pressure of the raw materials dispensed into the mix head. For high pressure machines a pressure of >40 bar is used, for low pressure machines of <30 bar. To achieve those pressure ranges different pumps and injection devices into the mix head are utilized. In general, various liquid raw material streams are pumped into the mix head. In the mix head a stirrer homogenizes the various raw materials resulting in a start of the reaction. Also gases could be added into the mix head, for example to support nucleation. The reaction mixture afterwards leaves the mix head and is either dispensed directly on the moving process liner, which is called the liquid laydown technology or is fed into a trough from which the already creaming reaction mixture flows afterwards onto the process liner (trough or Maxfoam technology). Afterwards the reaction mixture expands in a vertical direction (in case the main movement is horizontal). Here, the foam expansion could be either to the top or to the bottom or in both directions simultaneously. For the foam expansion just to the top a flat horizontal conveyor is used. For the foam expansion to the bottom a fall plate system is used. The fall plate position resembles the rise profile of the foam and need to be precisely adjusted to avoid foam defects. This is the main task to be solved for the current invention. Once the foam reaches the full rise usually a blow-off is observed and the foam turns from a closed cell to an open cell material. This is also moment when the full rise of the foam is reached. The cell opening is driven by the destabilization and bursting of membranes in the polyhedron structure. The cell opening is driven by phase separation processes in the material. The foam block settles a little bit (settling) till the rapid viscosity increase due to the reaching of the gel point stabilizes the foam and turns it into a solid material no longer being able to flow. The foam block is further transported in the tunnel to complete the chemical reaction. After several meters the tunnel ends and a saw cuts the continuously produced flexible foam into blocks. The length of those foam blocks is typically between 2 and 80 meters. The blocks are transferred into a storage rack where the hot foam blocks cool down and undergo final curing reactions. As the temperature is typically as high as 140° C. and the material has good insulating properties this takes 1-2 days. Afterwards the foam blocks are transferred into the storage area or directly used in further production steps.

It is possible to use any methods known to the person skilled in the art for production of flexible PU foams. For example, the foaming operation can be executed either in the horizontal or in the vertical direction.

The compositions used in accordance with embodiments of the invention may similarly be used for liquid $CO_2$ technology. Use in low-pressure and high-pressure machines is possible. Raw materials to be processed being able to be metered directly into the mixing chamber or be admixed even before the mixing chamber with one of the components which then go into the mixing chamber. Admixture in the raw material tank is also possible.

An exemplary formulation for production of hot-cure flexible PU foam (flexible slabstock foam) and comparison of properties of flexible PU foam blocks produced by conventional processes and those produced according to embodiments of the present disclosure will be discussed further below in conjunction with Tables 1-3 and FIG. 7.

FIG. 1 illustrates a foam production machine 100, according to an embodiment of the present disclosure. The production machine 100 includes a mixing head 102, a plurality of inclined fall plates 104a, 104b, 104c, 104d, 104e and a conveyor 106, configured to produce foam 137. The mixing head 102 is configured to mix raw materials (e.g., precursor reagents) for forming a reactive mixture 136. In one embodiment, the foam 137 is shaped as a foam block 137, and in another embodiment, the foam block is a rectangular-shaped foam block.

In one embodiment, the precursor reagents are received by the mixing head 102 via one or more transport conduits, such as hoses 108. The conduits 108 may be connected to one or more storage containers (not shown) that store the reagents under predetermined conditions, such as predetermined pressures and/or temperatures. The predetermined conditions may depend upon the types and/or proportions of reagents to be mixed together, and are commonly known by those of skill in the art.

In one embodiment, a pour plate 110 receives the mixed reagents (i.e., the reactive mixture) from the mixing head 102. In one embodiment, the mixing head 102 is stationary as it dispenses the reactive mixture 136 onto the pour plate 110 via a nozzle 103, and the reactive mixture spreads out to form a layer having a substantially uniform height on the pour plate 110. In another embodiment, the mixing head 102 is configured to move in a laterally direction 112 as the reactive mixture is dispensed onto the pour plate 110, thereby enabling the mixture to form a layer having a substantially uniform height on the pour plate 110.

In one embodiment, a transport medium 114 positioned on the pour plate 110 receives the mixed reagents from the mixing head 102. In one embodiment, the transport medium 114 is a paper sheet, however the scope of the invention covers other known mediums (e.g., impregnated paper, plastics, foils) that can be formed as thin layers or sheets to be used to receive mixed reagents. The transport medium 114 is pulled across the pour plate 110, the inclined fall plates 104, and the conveyor 106 by the motion of the conveyor 106. For example, the production machine 100 may be initialized by feeding the transport medium 114 (e.g., paper sheet) from a transport medium feed 116 across the pour plate 110 and the inclined fall plates 104 for attachment to the conveyor 106. In one embodiment, the conveyor 106 may be a conveyor belt configured for connecting with the transport medium 114, either by frictional forces or mechanically (e.g., via surface projections (not shown) of the conveyor belt, such as hooks). The conveyor belt 106 may have an adjustable speed for pulling the transport medium 114 and the reactive mixture positioned on top of the transport medium 114 at the adjustable speed. In one embodiment, the conveyor belt 106 is positioned substantially horizontal, as illustrated. As illustrated, the transport medium 114 is positioned between a bottom surface 135 of the reactive mixture 136 the inclined fall plates 104 and the conveyor 106.

In one embodiment, a first inclined fall plate 104a is configured to receive the reactive mixture from the pour plate 110 as the transport medium 114 holding the reactive mixture is pulled across the fall plates 104 by the action (i.e., motion) of the conveyor 106. Five inclined fall plates 104 are shown for ease of illustration, however the scope of the present disclosure covers any number of inclined fall plates.

In one embodiment, each inclined fall plate 104 has two ends (i.e., proximate end 118 and distal end 120). Each end of each inclined fall plate 104 is vertically adjustable. In one embodiment, each end of each inclined fall plate 104 is configured to be removably attached to inclined fall plate framework (not shown) for securing each end at a respective vertical position.

In another embodiment, each end 118, 120 is rotatably connected to a vertically-adjustable pivot axis 122 for positioning each end at a respective vertical position. When the vertical positions of two adjacent pivot axes 122 is selected, the vertical position of the two ends 118, 120 of the inclined fall plate 104 which connect to the two adjacent pivot axes 122 is also determined, and thus the slope of the inclined fall plate is determined. For example, a vertical position of a first pivot axes 122a may be set such that the proximate end 118a of the first inclined fall plate which is connected to the first pivot axis 122a 104a is level with (i.e., at the same vertical height of) the pour plate 110. Then, by setting the vertical position of the second pivot axis 122b, the slope of the first inclined fall plate 104a may be determined given a length of the first inclined fall plate 104a. The slope of the first fall plate is rise/run, which is the difference between the vertical positions of the first and second pivot axes divided by the square root of the length of the plate squared minus the difference between the vertical positions of the first and second pivot axes squared.

Although the vertical position of the first pivot axis 122a is illustrated to be coincident with the vertical position of the pour plate 110, the scope of the invention includes the vertical position of the first pivot axis 122a to be below the vertical position of the pour plate 110, thereby creating a vertical gap (or fall) between the proximate end 118a of the first incline fall plate 104a and the pour plate 110.

In one embodiment, a machine 100 having n inclined fall plates has n pivot axes, where n=5 as illustrated. The scope of the present disclosure covers any number n of inclined fall plates 104 and pivot axes 122. In the embodiment as illustrated, the ends of adjacent inclined fall plates share a pivot axis (i.e., are connected to the same pivot axis). For example, the distal end 122a of the first inclined fall plate 104a and the proximate end 118b of the second inclined fall plate 104b are rotatably connected to the vertically-adjustable second pivot axis 122b, such that no vertical gap exists between the distal end 122a of the first inclined fall plate 104a and the proximate end 118b of the second inclined fall plate.

However, the scope of the present disclosure covers embodiments that have n inclined fall plates and 2(n−1)+1 pivot axes. In this embodiment (not illustrated), the distal and proximate end of each inclined fall plate is rotatably connected to two respective vertically-adjustable pivot axes, such that a vertical gap between the distal and proximate ends of two adjacent inclined fall plates may be created by adjusting the respective pivot axes connected to the distal and proximate ends of the two adjacent inclined fall plates to have different vertical positions.

As illustrated, in one embodiment the conveyor 106 is configured to receive the reactive mixture from a last inclined fall plate 104e as the transport medium 114 holding the reactive mixture is pulled across the last inclined fall plate 104e onto the conveyor 106 by the action (i.e., motion) of the conveyor 106.

Figure 2:
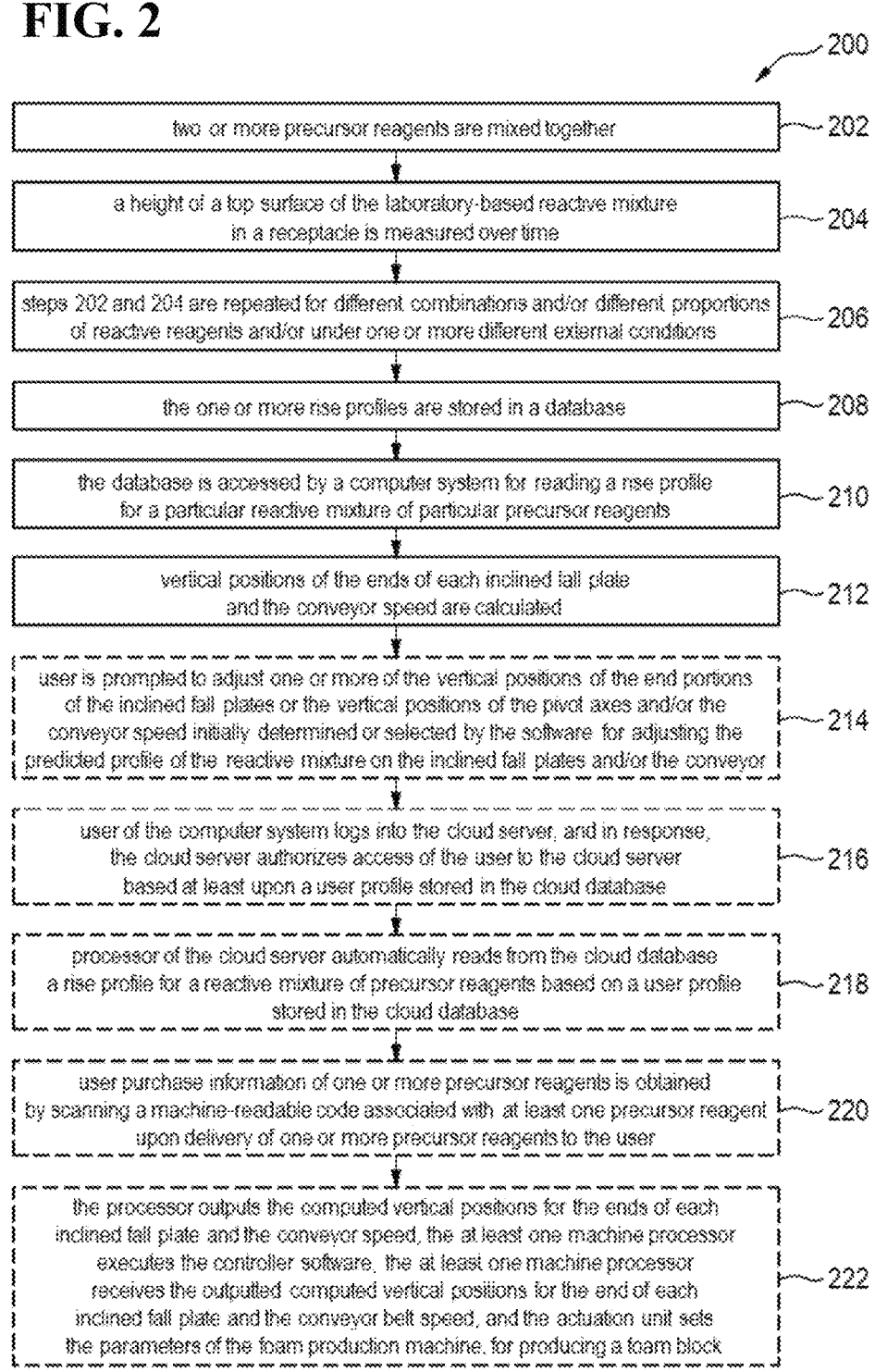
FIG. 2 illustrates a flowchart of a method for determining machine parameters of a foam production machine, according to an embodiment of the present disclosure.

FIG. 2 illustrates a method 200 for determining machine parameters of a foam production machine, according to an embodiment of the present disclosure. The method covers machine parameters of foam production machine 100 and machine parameters of foam production machine 400. Foam production machine 400 is discussed further below in conjunction with FIG. 4.

Figure 5:
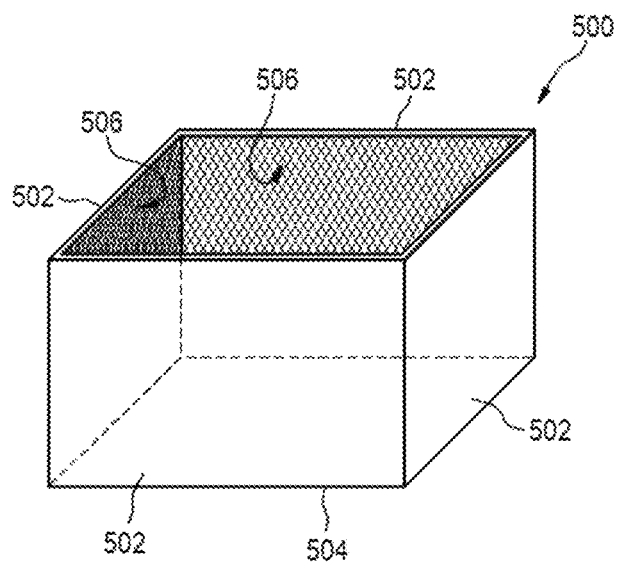
FIG. 5 illustrates a receptacle, according to an embodiment of the present disclosure.

In step 202, two or more precursor reagents are mixed together for forming a reactive mixture, also referred to as laboratory-based reactive mixture. In one embodiment, the two or more precursor reagents are mixed together in a receptacle (FIG. 5) for forming the reactive mixture. The receptacle is external to, and is not a component of, the foam production machine 100. In another embodiment, the two or more precursor reagents are mixed together in another receptacle, such as a paper cup or beaker, and the mixed reagents are then poured into the receptacle (FIG. 5). In one embodiment, the precursor reagents include at least one liquid polymer and at least one catalyst. In another embodiment, the at least one liquid polymer include at least one liquid polyurethane. In other embodiments, the precursor reagents include the embodiments of the combination of reagents described above in conjunction with flexible PU foams.

In step 204, a height of a top surface of the laboratory-based reactive mixture in the receptacle is measured over time, and the height of the top surface as a function of time is defined as the rise profile. The rise profile may include pairs of height data and time data, where any given pair of data includes the measured height of the reactive mixture and the time at which the height was measured. In one embodiment, time is measured with respect to when the precursor reagents are mixed together. In another embodiment, time is measured with respect to when creaming first occurs. In another embodiment, time is measured with respect to when full rise is reached and cell opening occurs.

In one embodiment, the rise profile is the height of the mixture, as measured in a laboratory, as the precursor reagents react to form a foam. The height of the mixture is measured in a laboratory, at different points in time, after the reagents are mixed together. Measurements are made as the reactive mixture transforms from a liquid mixture to a turbid liquid mixture and to a foam, or in other words, as the mixture transitions through the creaming point and the full-rise/blowoff point. Creaming time is the time taken from the initial phase of the mixing of the raw materials until volume expansion of the reaction mixture starts due to the formation of gases converting the liquid reaction mixture into a foam. In other words, creaming time is the length of time, as measured from the initial mixing of the precursor reagents, for volume expansion to start. Blow-off point is reached when the closed cell polyhedron structure turns into an open cell structure and the foam settles a bit. The expansion of the foam stops at the blow-off point at a sudden. Therefore, the full rise is reached in the moment of the blow-off and is also called full rise point. The full rise point is often visible by the bursting of larger cells at the top surface of the foam.

Creaming points, creaming times and blow-off points (=full rise points), blow-off times (=full rise times) are well known to those of skill in the art and will not be discussed in further detail.

In one embodiment, the receptacle is stationary. That is, and in contrast to processing the reactive mixture by a foam production machine in which the reactive mixture is transported through the machine via action of a conveyor or other transport means, the reactive mixture is provided to a stationary receptacle that is not a component of a foam production machine, and the reactive mixture reacts to generate a foam in the stationary receptacle. In another embodiment, the movement of the reactive mixture with respect to the receptacle includes only a movement of a top surface of the mixture as the height of the top surface increases or expands upward as the mixture is converted into a foam.

In one embodiment, a laser beam is used to measure a height of a top surface of the laboratory-based reactive mixture in the receptacle at different points in time. However, the scope of the present disclosure includes other conventionally-known methods of measuring surfaces of liquids and/or foam mixtures in receptacles as the height of the top surface increases.

In one embodiment, steps 202 and 204 include a discontinuous box foaming procedure (also referred to as a discontinuous receptacle foaming procedure, carried out in, for example, a receptacle (FIG. 5)) for measuring the rise profile of flexible foam formulations. Raw materials are stored in a climate cabinet with the temperature which is intended to be used in a real slabstock foam production. In case of different temperatures for the various raw materials in the real slabstock foam production, in the laboratory the mean temperature was used for pre-conditioning of raw materials. Afterwards raw materials were weighted into a paper cup. Just the TDI (i.e., tolylene diisocyanates) was left aside and later added shortly before the final mixing. The amount of raw materials was calculated to fill the box completely after foaming. In addition to matching temperatures of precursor reagents in the receptacle to temperatures of the same precursor reagents in the foam production machine and/or matching an ambient temperature of the receptacle to an ambient temperature of the foam production machine, other environmental conditions in the laboratory, represented by such environmental parameters as ambient pressure and ambient humidity, may also be adjusted or selected to match corresponding environmental conditions of the respective foam production machines for which machine parameters are to be determined. Matching environmental conditions include substantially matching one or more environmental parameters, which include temperature of one or more of the precursor reagents (i.e., raw materials), ambient temperature, ambient pressure and/or ambient humidity.

The mixing was done in a paper cup filled with the raw materials (TDI being added last while stopping the stirrer). After the mixing the reaction mixture was poured into the box. The box is a square box made from 1 cm thick insulating rigid polyurethane foam. The rigid foam plates are glued together on the outside to form a box by adhesive tape.

Inside the box a process liner (FIG. 5), used in large-scale continuous production of flexible slabstock foam, was used to separate the box from the liquid reaction mixture. That is, a process liner lines the inside of the box, and in commercial foam production machines, a process liner receives the reactive solution, glides over the fall plates and may extend over the sidewalls of the fall plates. The scope of the present invention covers process liners composed of any material that reduces friction between the walls of the box and the sidewalls of the fall plates. The process liner can be, for example, paper, impregnated paper, PE coated paper, etc. Impregnated paper is well-known in the industry, being a sheet with liquid retaining properties. It is typically made from wooden pulp and natural cotton linter. Materials such as plastic or latex are used to percolate the paper rather than coating it to increase its tearing resistance, wet strength, and oil resistance. Based on the type of resin, the impregnated paper market can be segmented into phenol, melamine, and urea.

According to embodiments, the process liner of the box (i.e., receptacle) is the same as the process liner (referred to as the transport medium 114) of the foam production machine of the method 200, for obtaining a high accuracy between the rise profile as measured from the discontinuous foam process in the laboratory receptacle and the true rise profile of the continuous foam process in the foam production machine. Conventional laboratory boxes used to measure properties of reactive mixtures do not use industrial flexible foaming process liners. For example, in one embodiment, a chemical composition of at least a surface of the transport medium 114 of the foam production machine matches a chemical composition of at least a surface of the process liner used for generating the rise profile stored in the database, where the surfaces are those surfaces in contact with the respective reactive mixtures. The scope of the present invention also covers process liners that are integrated into the side and/or bottom panels of the laboratory receptacles, as well as side and/or bottom panels being composed of a material or composition of materials that function as a process liner. For example, at least the surfaces of the sides and/or bottom panels may be composed of process liner material, such as plastic or latex (e.g., PE), and/or paper, impregnated paper. Impregnated paper is well-known in the industry, being a sheet with excellent water absorbing and liquid retaining properties. It is typically made from wooden pulp and natural cotton linter. Materials such as plastic or latex are used to percolate the paper rather than coating it to increase its tearing resistance and wet strength.

This process liner was folded and fixed by staples to fit into the box. The process liner consists of a layer of a robust and tear resistant brown paper covered by a plastic film. The plastic film prevents the penetration of liquid components into the paper and could be made from various thermoplastic polymers like polyolefins (PE, PP) or polyesters. The paper itself provides strength for the transportation of the reaction mixture and the formed foam block. The process liner may be used for commercial flexible foam slabstock production. In one embodiment, the box has dimensions of 30 cm×30 cm×30 cm and is open at the top. Above the box is a height measurement device installed recording continuously the height of the reaction mixture in the box. In the procedure, the recording of the height is started once the mixed raw materials are poured into the box. The rise curve may be recorded and displayed.

In step 206, steps 202 and 204 are repeated for different combinations and/or different proportions of reactive reagents and/or under one or more different external conditions, such as different ambient temperatures and/or pressures, for creating two or more rise profiles. Each rise profile corresponds to a particular combination of reactive reagents reacting with one another under a particular set of ambient environmental conditions. In one embodiment, steps 202 and 204 are performed under environmental conditions that match environmental conditions in operating the foam production machine. For example, ambient pressures, ambient temperatures, ambient humidity and/or reactive reagent temperatures are some of the environmental parameters that may be matched.

In step 208, the one or more rise profiles are stored in a database.

In step 210, the database is accessed by a computer system 600 (FIG. 6) for reading (also referred to as importing) a rise profile for a particular reactive mixture of particular precursor reagents. In one embodiment, the computer system is a conventional computer system including at least one processor configured to execute software for reading the rise profile. According to an embodiment, a user of the computer system may define components and/or proportions of the components of a reactive mixture, as well as other parameters that effect the reactive rate of the reactive mixture, such as temperature and/or pressure under which the reaction occurs, and in response, the processor reads (or imports) the profile from the database that corresponds to the parameters defined by the user. In one embodiment, the processor, upon executing the software, queries the user for input parameters. In one embodiment, the rise profile data include values for the creaming time and the full rise time and the software imports them together with the other rise profile data. In another embodiment the software asks the user to provide creaming time and full rise time for the corresponding rise profile. In another embodiment the software determines the creaming time as well as the full rise time by analyzing automatically the shape of the rise profile, which could be done as the slope of the rise profile changes in both positions. At the creaming point the differential quotient turns from zero to positive values. At the full rise point the differential quotient turns from positive values to zero or even negative values.

Alternatively, upon initial execution of the software, the computer system may authenticate the user, and upon authentication, the processor reads (or imports) a rise profile from the database based upon a user profile stored in the database. The user profile may include reagents or reactive mixtures previously used by or purchased by the user. In one embodiment, the user indicates which of the rise profiles of the rise profile associated with the user and stored in the database to import.

In step 212, vertical positions of the ends of each inclined fall plate (e.g., vertical positions for the pivot axes) and the conveyor speed (e.g., conveyor belt speed) are calculated, by the software executed by the computer system, based upon the imported rise profile, that results in a predefined predicted profile of the reactive mixture on the plurality of inclined fall plates as the reactive mixture is transported along the plurality of inclined fall plates. As discussed above in conjunction with FIG. 1, the reactive mixture may be transported along the plurality of inclined fall plates as the transport medium, upon which the reactive mixture is positioned, is transported along the plurality of inclined fall plates via action of the conveyor pulling the transport medium across the pour plate and the inclined fall plates.

In one embodiment, the software includes algorithms that selects a conveyor speed (e.g., a speed of a conveyor belt, which is equal to the speed at which the reactive mixture is transported along both the pour plate and the inclined fall plates), in a range of conventional conveyor belt speeds for foam production machines in a way that creaming line and full rise line are in predefined positions, and determines vertical positions of the ends of each inclined fall plate (e.g., vertical positions of the pivot axes which correspond to the vertical positions of the ends of each fall plate), such that the change in height of the reactive mixture on any one particular inclined fall plate over the time interval that the reactive mixture is on the particular inclined fall plate is at least partially offset by a fall in vertical height due to the slope of the particular inclined fall plate.

By way of example, if the conveyor belt speed is Vx, where x is in the horizontal direction, then the speed of the mixture in the y-direction on an inclined fall plate is the slope of the inclined fall plate multiplied by Vx. In one embodiment, the algorithm selects the vertical positions of the ends of an inclined fall plate (i.e., selects the slope of the inclined fall plate) such that the time interval that the mixture is on the inclined fall plate times the speed Vy of the mixture on the inclined fall plate is equal to the change in height of the reactive mixture during this time interval as given by the rise profile. The time that the mixture is on any particular inclined fall plate is the length of the fall plate divided by the speed of the mixture on the fall plate (i.e., sqrt(Vx2+Vy2)). By equating the change in height of the reactive mixture during the time interval that the reactive mixture is on each of the inclined fall plates to the change of vertical height between end points of each of the respective inclined fall plates, a predefined predicted profile may be obtained for the reactive mixture across all of the inclined fall plates. In the specific embodiment discussed above, the predefined predicted profile has a substantially flat, horizontal profile (i.e., a substantially flat, horizontal top surface).

However, in a preferred embodiment, the vertical positions of the ends of each inclined fall plate (e.g., vertical positions for the pivot axes) and the conveyor speed (e.g., conveyor belt speed) are calculated, by the software executed by the computer system, based upon the imported rise profile, that results in a predefined predicted profile of the reactive mixture on the plurality of inclined fall plates having a substantially flat, inclined top surface.

Figure 3:
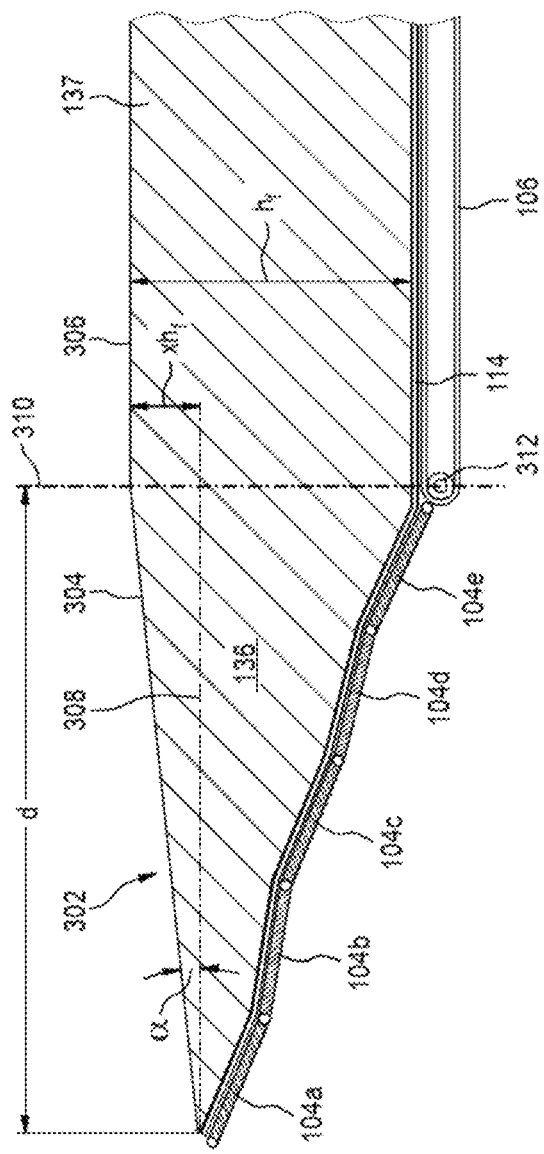
FIG. 3 illustrates a predefined predicted profile of the reactive mixture on the plurality of inclined fall plates having a substantially flat, inclined top surface, according to an embodiment of the present disclosure.

FIG. 3 illustrates a predefined predicted profile 302 of the reactive mixture on the plurality of inclined fall plates 104 having a substantially flat, inclined top surface 304, according to an embodiment of the present disclosure. As illustrated, the substantially flat top surface 304 of the reactive mixture on the plurality of inclined fall plates 104 has an inclination angle α of approximately arctan [(predefined fraction x of a height hr of the foam 137 on the conveyor)/(a horizontal length d of the plurality of inclined fall plates)] =arctan [(x·$h_f$)/d]. In a preferred embodiment, x is approximately ⅓, and thus x·$h_f$ is equal to approximately ⅓ the height of the foam 137 on the conveyor 106. The inventors have surprisingly discovered that using an imported rise profile for calculating the positions of the vertical positions of the ends of the inclined fall plates and the conveyor speed to give a predicted rise profile having a positive inclination angle (i.e., not zero), and more specifically, basing the positive inclination angle on the reactive mixture 136 rising approximately 30% while being transported across the plurality of inclined fall plates, results in foam 137 on the conveyor having a substantial flat (i.e., non-domed) top surface 306. The angle α is defined as the angle formed between a horizontal plane, which includes horizontal line 308, and the inclined top surface 304. A vertical plane, which includes vertical line 310, is defined to be the vertical plane that passes through end portion 120e of the inclined fall plate 1104e.

In one embodiment, a user selects a conveyor speed and/or a number of inclined fall plates 104 and/or lengths of the inclined fall plates 104 and/or a positioning of the creaming line 132 (via adjustments to the pour plate 110 length dimensions and/or a size of the trough 123, described in conjunction with FIG. 3 below (e.g., trough volume) and/or position of a side surface trough lip 130 of the trough with respect to a bottom surface 126 of the trough) that results in the reactive mixture rising approximately 30% while being transported across the plurality of inclined fall plates. The vertical positions of the ends of each inclined fall plate (e.g., vertical positions for the pivot axes), given a selected conveyor speed as described above, are calculated, by the software executed by the computer system, based upon the imported rise profile, that results in the predefined predicted profile of the reactive mixture on the plurality of inclined fall plates having a substantially flat, top surface with inclination angle α.

Figure 4:
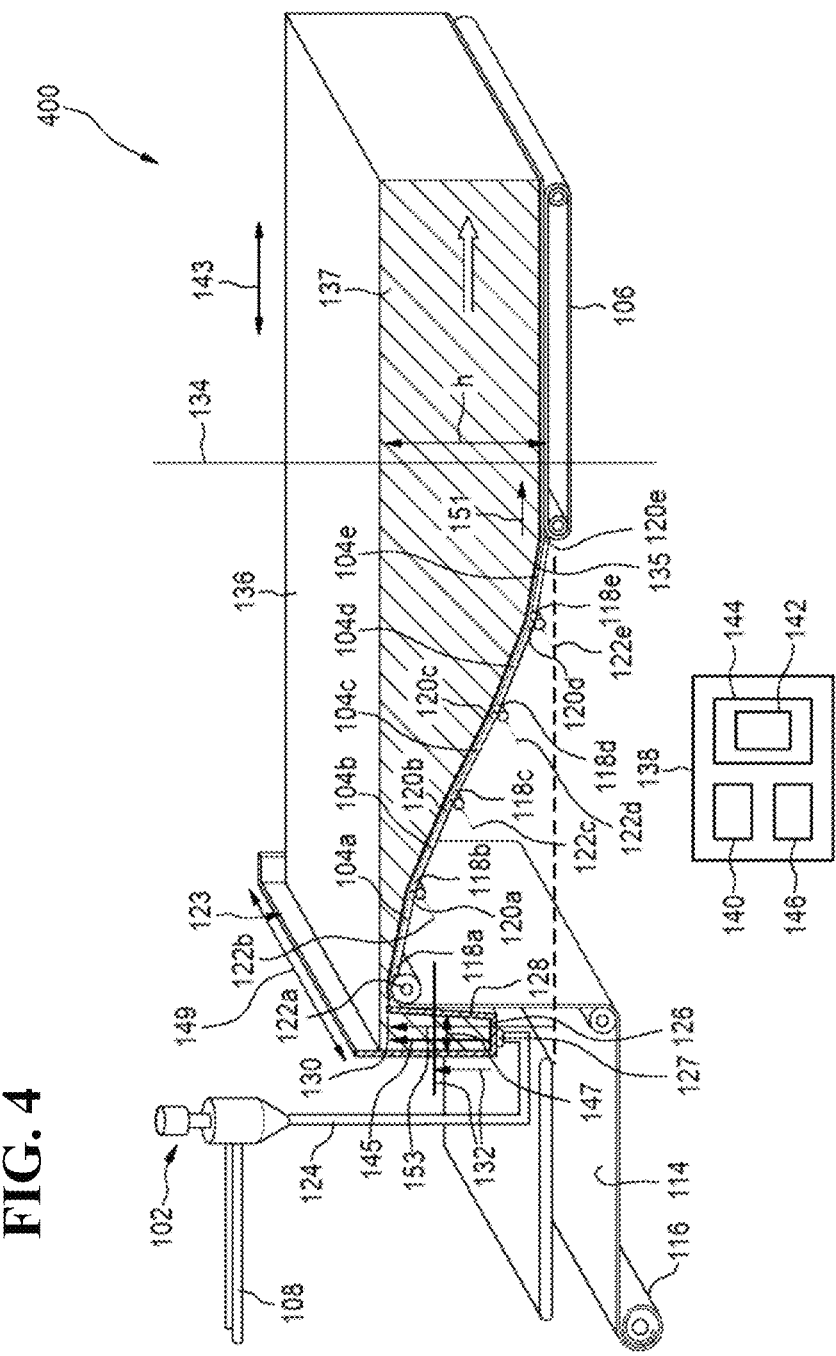
FIG. 4 illustrates a foam production machine, according to another embodiment of the present disclosure.

FIG. 4 illustrates a foam production machine 400, according to another embodiment of the present disclosure. The reference numbers of foam production machine 400 having the same reference numbers of foam production machine 100 refer to similar components. As illustrated, foam production machine 400 does not include the pour plate 110 of machine 100, but instead includes a trough 123. In this embodiment, the trough has a bottom surface 126 including an input port 127 configured to receive the reactive mixture from the mixing head via a mixing head to trough conduit 124 (MTT conduit 124). The trough also includes a side surface 128 and a side surface lip 130 over which the reactive mixture 136 flows onto the proximate end 118a of the first inclined fall plate 104a. That is, the first inclined fall plate is configured to receive the reactive mixture from the trough.

As illustrated, and dependent upon the dimensions of the trough 123 (e.g., the volume of the trough), the rate of flow of the mixture into the trough 123 through the input port 127 and the time it takes the mixture to travel from the mixing head 102 to the trough 123 via the MTT conduit 124 (collectively referred to as mixing head/trough parameters), a creaming line 132 will be positioned somewhere within the trough 123. In one embodiment, the mixing head/trough parameters are selected to give a creaming line 132 that is located about ⅔ of the distance between the bottom surface 126 of the trough 123 and a top surface of the reactive mixture in the trough 123, which coincides with the lip 130 of the trough 123. Furthermore, in another embodiment, the conveyor speed and the number of inclined fall plates and/or a length of each inclined fall plate is selected, and in some embodiments the mixing head/trough parameters are selected, to give a blow line (position of the full rise line) 134 that is located somewhere above the conveyor, as illustrated. It has been proven by trials that the best results have been obtained if the blow line (position of the full rise line) 134 is between 0.2 to 1.2 m after passing the last fall plate. This is the preferred position for the blow line (position of the full rise line) 134. By variation of conveyor speed, trough size and output of raw materials, the position of the creaming line and the position of the full rise line are set to match the predefined positions. Afterwards, in order to obtain foam 137 positioned on the conveyor 106 that has a predicted profile having a substantially flat surface, or preferably a substantially flat, inclined surface, it may be important to not only select the vertical positions of the ends of each of the inclined fall plates (or the vertical positions of the pivot axes in some embodiments) and the conveyor speed based upon the imported rise profile, but to also select one or more of the number of inclined fall plates and/or a length of each fall plate, conveyor speed and/or mixing head/trough parameters to give a blow line 134 that is located in a horizontal direction 0.2 m to 1.2 m after the last fall plate above the conveyor 106 and a creaming line 132 located about ⅔ the distance between the bottom surface 126 of the trough 123 and a top surface of the reactive mixture (i.e., the vertical position of the lip 130) in the trough 123.

Referring back to FIG. 2, step 212 may additionally include calculating the vertical positions of the ends of each inclined fall plate and the conveyor belt speed, by the software executed by the computer system, based upon the imported rise profile and further based on one or more of: a vertical position of the lip 130 of the trough 123 relative to a vertical position of the proximate end 118a of the first inclined fall plate 104a and a size of the trough 123 as defined by a length between the bottom surface 126 of the trough 123 and the lip 130 of the trough 123, that results in a substantially horizontal or inclined predicted profile of the reactive mixture on the plurality of inclined fall plates 104 as the reactive mixture is transported along the plurality of inclined fall plates 104.

In optional step 214, a user is prompted to adjust one or more of the vertical positions of the end portions 118, 120 of the inclined fall plates 104 or the vertical positions of the pivot axes 122 (which correspond to the vertical positions of the respective end portions 118, 12 of the inclined fall plates 104) and/or the conveyor speed initially determined or selected by the software for adjusting the predicted profile of the reactive mixture on the inclined fall plates 104 and/or the conveyor 106. For example, if the machine settings initially determined by the software do not result in the production machine 100, 400 generating in foam 137 having a substantially flat top surface above the conveyor 106, or if the user wants to adjust the predicted profile of the mixture to have a profile not having a substantially flat top surface above the inclined fall plates in order to achieve a substantially flat top surface of foam 137 above the conveyor 106, the user may input or otherwise change one or more of the vertical positions of the end portions 118, 120 of the inclined fall plates 104 or the vertical positions of the pivot axes 122 (which correspond to the vertical positions of the respective end portions 118, 120 of the inclined fall plates 104) and/or the conveyor speed initially selected/determined by the software. Upon receiving the user input, the software computes a new predicted profile of the reactive mixture above the inclined fall plates 104 based upon the imported rise profile and the user input.

In another embodiment of the present disclosure, the computer system 600 (FIG. 6) additionally includes a network and a cloud server, where the cloud server includes at least one processor and a cloud database. In one embodiment, the processor that executes the software is a component of the cloud server. The user may have an account with the cloud server.

In optional step 216, a user of the computer system logs into the cloud sever, and in response, the cloud server authorizes access of the user to the cloud server based at least upon a user profile stored in the cloud database. The cloud server then executes the software.

In optional step 218, the processor of the cloud server automatically reads (or imports) from the cloud database a rise profile for a reactive mixture of precursor reagents based on a user profile stored in the cloud database, for example. In one embodiment, the user profile includes purchase information of at least one of the precursor reagents of the reactive mixture.

In optional step 220, user purchase information of one or more precursor reagents is obtained by scanning a machine-readable code associated with at least one precursor reagent upon delivery of one or more precursor reagents to the user. In one embodiment, and referring back to optional step 218, the processor of the cloud server automatically reads (or imports) from the cloud database the rise profile for a reactive mixture of precursor reagents based on the machine-readable code scanned in optional step 220.

According to a further embodiment of the present disclosure, the foam production machine 100, 400 further includes a machine control unit 138 (see FIG. 4). The machine control unit 138 includes at least one machine processor 140, controller software 142, memory 144 configured for storing the controller software 142 and an actuator unit 146 that includes one or more actuators (not shown) for controlling the settings of the foam production machines 100, 400. For example, the one or more actuators may control (e.g., adjust or initially set) one or more of the vertical positions of the ends of each of the inclined fall plates, a rate of flow of the mixture from the mixing head 102 to the pour plate 110 or to the trough 123, a speed of the conveyor 106, longitudinal (i.e., a direction parallel to motion of the conveyor 106 and foam 137) positioning of the nozzle 103 of the mixing head 102, or in other words, longitudinal positioning of the laydown position 139 (FIG. 1) and/or vertical positioning 141 of the nozzle 103 (FIG. 1), the vertical position 155 of the pour plate with respect to the position of the conveyor, the volume of the trough 123 (FIG. 4) via adjusting and/or setting one or more of the width 147, length 149 and height 145 of the trough, and a vertical position 153 of the trough 123, e.g., vertical position of the lip of the trough, with respect to the position of the conveyor 106. Actuators are commonly known and may include pneumatic or electrically controlled elements that adjust positions and speeds of components of the production machines 100, 400.

Referring back to FIG. 2, the method 200 may optionally include step 222. In optional step 222, the processor outputs the computed vertical positions for the ends of each inclined fall plate and the conveyor speed, the at least one machine processor 140 executes the controller software 142, the at least one machine processor 140 receives the outputted computed vertical positions for the end of each inclined fall plate and the conveyor belt speed, and the actuation unit 146 sets the parameters of the foam production machine 100, 400 for producing a foam block. Setting the parameters includes both initially setting the parameters of the machine 100, 400 and adjusting the parameters of the machine 100, 400 to have different values.

FIG. 5 illustrates a receptacle 500, according to an embodiment of the present disclosure. The receptacle 500 four side walls 502 and a bottom surface 504. The side walls 502 and the bottom surface 504 are covered by a process liner 506, as previously described above. Although the receptacle as illustrated is shaped as a box, the scope of the present invention includes any polygonal-shaped container, preferable having no top surface or lid. Characteristics of the receptacle 500 are previously described above. For example, the receptacle 500 may be thermally-insulating box or other polygonal-shaped container. In one embodiment, the side walls 502 and/or the bottom surface 504 are made from rigid foam insulation plates, and may have for example, a thickness of 1 cm. In another embodiment, the process liner 506 is integrated into the side walls 502 and/or the bottom surface 504.

Figure 6:
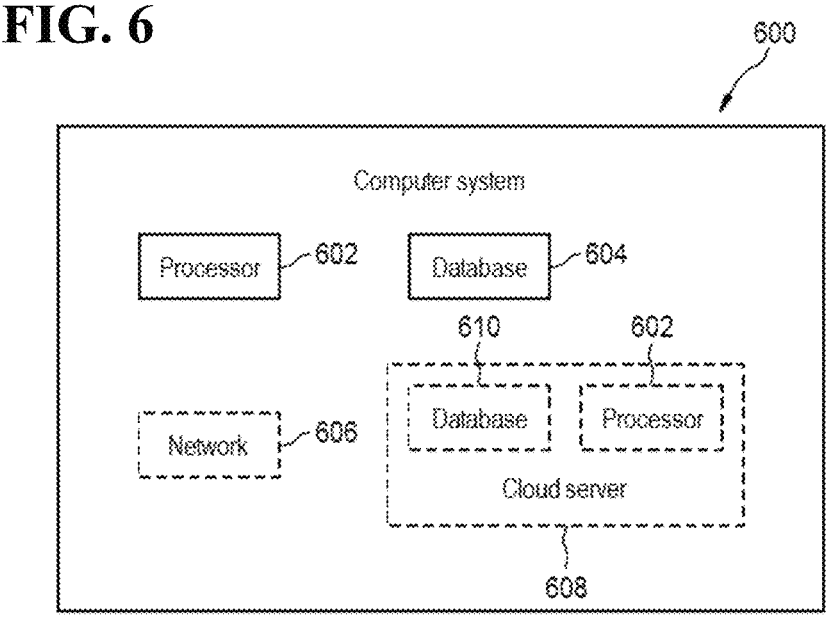
FIG. 6 illustrates a computer system, according to an embodiment of the present disclosure.

FIG. 6 illustrates a computer system 600, according to an embodiment of the present disclosure. The computer system 600 includes at least one processor 602 and a database 604. In another embodiment, the computer system 600 additionally includes a network 606, a cloud server 608. The cloud server 608 may also include a cloud database 610. In one embodiment, the cloud server optionally includes the at least one processor 602. Computer systems, such as computer system 600, typically includes a variety of computer system readable media. Such media may be any available media that is accessible by computer systems, and it includes both volatile and non-volatile media, removable and non-removable media.

For the purposes of the description of embodiments of the present disclosure, reactive mixture 136 (FIGS. 1, 3 and 4), as it is being transported along the fall plates and conveyor, is continuously being converted, via chemical reactions, from a more liquid state to a more solid state, and thus reactive mixture refers to the mixture created after the initial mixing of the precursor reagents up until the blowoff point. (also referred to as blowoff line). The mixture between these points has at least partially developed into a foam, although for the purposes of the present disclosure, the wording foam refers to the foam 137 which is on the conveyor after the blow-off line. The foam 137 is also referred to as slabstock foam.

Properties of the flexible PU foam blocks made with conventional processes and innovative process according to embodiments of the present disclosure.

TABLE 1

| Exemplary formulation 1 for production of hot-cure flexible PU foam (flexible slabstock foam) | |
|---|---|
| Formulation 1 | Parts by mass (pphp) |
| Polyol 1[1) | 100 parts |
| water | 4.00 parts |
| Tin catalyst[2) | 0.20 parts |

TABLE 1-continued

Exemplary formulation 1 for production of hot-cure flexible PU foam (flexible slabstock foam)

| Formulation 1 | Parts by mass (pphp) |
|---|---|
| DABCO ® 33 LV[3] | 0.15 parts |
| FOAM STABILIZER [4] | 1.00 parts |
| Desmodur ® T 80[5] | 52.9 parts |

[1] Polyol 1: VORANOL ® CP 3322 available from Dow Chemical, a glycerol-based polyether polyol having an OH number of 48 mg KOH/g and predominantly secondary OH groups, average molar mass = 3500 g/mol.
[2] KOSMOS ® T9, available from Evonik Operations: tin(II) salt of 2-ethylhexanoic acid.
[3] DABCO ® 33LV: Diazabicyclooctane 33% dissolved in dipropylene glycol, available from Evonik Operations. Standard amine catalyst for production of polyurethane foams.
[4] Foam stabilizer TEGOSTAB ® BF 2370 available from Evonik Operations.
[5] tolylene diisocyanate T 80 (80% 2,4 isomer, 20% 2,6 isomer) from Covestro, 3 mPa · s, 48% NCO, functionality 2.

Methods for Characterization of PU Foam Samples:

The flexible PU foams produced may be assessed according to the following physical properties a) to g):

a) Full rise time: The period of time between the end of mixing of the reaction components and the blow-off of the polyurethane foam. The full rise time could also be measured from the first moment of the volume expansion (end of the creaming time). The scope of embodiments of the present description covers full rise times measured from the initial mixing of the reaction components and full rise times measured from the creaming time.

b) Maximum rise height: the maximum height of the free-risen foam. Foam height is reported in centimeters (cm).

c) Settling of the foam at the end of the rise phase (=fallback): The settling is found from the difference of the foam height after direct blow-off and 3 minutes after foam blow-off. The foam height is measured at the maximum in the middle of the foam crest by means of a needle secured to a centimeter scale. A negative value here describes settling of the foam after blow-off; a positive value correspondingly describes further rise of the foam.

d) Number of cells per cm (cell count): This is determined visually on a cut surface (measured to DIN EN 15702).

e) Foam density (FD): Determined as described in ASTM D 3574—11 under Test A by measuring the core density. Foam density is reported in kg/m³. For full scale industrial blocks, it is common to measure the foam density in 3 positions (top-middle-bottom) as the density usually shows a gradient in the foam block. Therefore, the density spread across the block is an important quality criterion. For laboratory box foaming just the center of the test block is used for measuring the foam density.

f) Porosity determined by the flow method: In the airflow method in accordance with ASTM D 3574 (2011-00), the volume of air that flows through a defined foam specimen in a particular period of time on application of a pressure differential is determined. For this purpose, 12 test specimens having dimensions of 5 cm×5 cm×2.5 cm were cut out of each of the finished foams transverse to the direction of rise of the foam, and successively inserted into an analytical instrument constructed for this method. The construction of this instrument is described in ASTM D 3574 (2011-00). The analytical instrument generates an air pressure differential of 125 Pa between the inside of the instrument and the surrounding atmosphere by sucking just enough air in through the test specimen for the differential to be kept constant. The air flow through the test specimen is thus a measure of the porosity of the foam. Values in the range from 0-6.5 scfm (standard cubic feet per min) were measured, with lower values within the interval characterizing a more closed foam and higher values a more open foam.

g) Foam hardness was determined according to DIN EN ISO 3386-1:2015-10 by cutting a 10 cm cube out of the foam sample and by performing the compression experiment. The pressure value at 40% compression was taken as CLD 40 (in kPa). For full scale industrial blocks, it is common to measure the foam hardness in 3 positions (top-middle-bottom) as the hardness usually shows a gradient in the foam block. Therefore, the hardness spread across the block is an important quality criterion. For laboratory box foaming just the center of the test block is used for measuring the foam hardness.

h) Creaming time: The period of time between the end of mixing of the reaction components and the start of the volume expansion of the reaction mixture.

For the sake of completeness, the measurement principle of DIN EN ISO 16000-9:2008-04 is also elucidated hereinafter.

400 g of polyol was used in each box foaming operation; the other formulation constituents were recalculated accordingly. For example, 1.00 part of a component denoted 1.00 g of this substance per 100 g of polyol.

The foaming was carried out by what is called manual mixing. Formulation 1 as specified in table 1 was used. All raw materials were pre-conditioned to the temperature relevant in the real production. In this example 21° C. was used. A paper cup was charged with polyol, the respective amine catalyst mixture, the tin catalyst tin(ll) 2-ethylhexanoate, water, foam stabilizer, and the contents were mixed at 1000 rpm for 60 seconds with a disc stirrer. After the first stirring the isocyanate (TDI) was added to the reaction mixture and stirred at 2500 rpm for 7 s and then immediately transferred into a box lined with a process liner (30 cm×30 cm base area and 30 cm height). The box is made from rigid foam insulation plates with 1 cm thickness. The process liner was the same one used in the subsequent industrial trial (Olmo paper by Mondi).

After being poured in, the foam rose up in the foaming box. In the ideal case, the foam blew off on attainment of the maximum rise height and then fell back slightly. The height of the foam is recorded while foam is rising by an ultrasonic height measurement device. To assess the properties of the resulting foam, the following characteristic parameters were determined: creaming time, full rise time, rise height and fallback of the foam after the end of the rise phase (=settling).

Results of the Discontinuous Foaming

Full rise time including creaming time: 100 s
Creaming time: 14 s
Full rise time without creaming time: 86 s
Maximum foam height: 30.51 cm
Settling: 0.12 cm
Number of cells per cm: 11
Foam density: 25.5 kg/m³
Air permeability: 3.1 scfm
Hardness, CLD 40:4.1 kPa The recorded full rise time including creaming time was 100 s (86 s without creaming time) and the time-resolved foam height data were exported with an interval of 1 s up to 300 seconds. The absolute height was afterwards recalculated into a relative height by division through the maximum height. The rise profile with relative height was exported to the simulation software. The measured full rise time as well as the creaming time were included as separate data in the exported file.

Data Processing and Development of Optimized Machine Settings

Industrial trials were afterwards planned for a FB-20 5 section fall plate foaming machine manufactured from LaaderBerg Aps, Langrabben 14, 6013 Ålesund, Norway. This machine was used without any flat-top processing equipment. The machine uses a trough and 5 fall plates. In these trials 3 blocks were produced in subsequent runs. The blocks are produced from the same formulation (i.e., formulation 1, as shown above). Various processing conditions were adjusted in between the runs.

The machine has the following overall dimensions and constant settings:
 trough volume: 80 L (for all trials)
 height of the trough: 30 cm
 height of trough over conveyor: 66 cm (⅔ of block height, for all trials)
 length fall plate 1: 175 cm
 length fall plate 2: 60 cm
 length fall plate 3: 120 cm
 length fall plate 4: 120 cm
 length fall plate 5: 85 cm In total the entire fall plate system has a length of 5.60 m. A standard process liner (OLMO paper by Mondi Coatings GmbH, Marxergasse 4A, 1030 Vienna, Austria) was used to cover conveyor and sides. The temperature for all raw materials was 21° C. All additional parameters like gas injection into the mix head (for nucleation) or pump settings were kept constant during the trials. Target block height directly at the end of the production tunnel was 1.00 m. Width of the conveyor was 2.10 m to be able to cut 2.00 m long mattresses after cooling and curing.

In total the entire fall plate system has a length of 5.60 m. A standard process liner (OLMO paper by Mondi Coatings GmbH, Marxergasse 4A, 1030 Vienna, Austria) was used to cover conveyor and sides. The temperature for all raw materials was 21° C. All additional parameters like gas injection into the mix head (for nucleation) or pump settings were kept constant during the trials. Target block height directly at the end of the production tunnel was 1.00 m. Width of the conveyor was 2.10 m to be able to cut 2.00 m long mattresses after cooling and curing.

For the trials, the machine parameters were determined (i.e., optimized) based on a) a calculated rise profile, b) an experimental rise profile generated in a discontinuous box foaming test, and c) parameters empirically established over years by a flexible foam producer. Scenario a) and c) represent conventional procedures, whereas b) represents the inventive procedure according to embodiments of the present disclosure.

For the simulation of the correct machine parameters, the rise profile was loaded into software which converts the time resolved expansion curve of the rise profile into a distance resolved expansion curve on top the fall plate system and subsequent conveyor system. An expansion ⅔ to the bottom and ⅓ to the top was considered to be ideal. Furthermore, the position of the full rise line was placed roughly 0.5 m after the end of the last fall plate by choosing various conveyor speeds. The position of the creaming line was in the trough as required. Using the trough volume of 80 L the creaming line was roughly at ⅔ of the trough height, which was considered to be the optimum. Output factor was chosen to provide a foam height of roughly 1.00 m after expansion. After adjustment of the output factor the position of the creaming line and the blow-off/full rise line was checked again. It was necessary to re-adjust the conveyour speed again a bit. Afterwards the output had to be adjusted again followed by a check of the positions of creaming line and position of the blow-off/full rise line. Two iteration cycles were necessary to minimize the deviations from predefined values in such a way that they were considered to be acceptable (+/−5 cm for the position of the full rise line, +/−2 cm for the creaming line, +/−0.5 cm for the block height). The calculation of the rise profile for scenario a) was done by assuming that the foam expansion always follows an S-curve: Slow start as reaction mixture is cold-fast expansion when reaction mixture warms up slowing down at the end when certain raw material get lower in concentration and the viscosity increase lowers reactivity. The S-curve was symmetrical to the slope turning point which was placed exactly in the middle. To determine the rise time a set of parameters was developed indicating the influence of various individual raw materials towards the rise time. Those parameters were determined in foaming trials by a variation of the raw material in focus and by plotting the rise time in a double logarithmic diagram against the concentration. The slope defines the parameter and is used in an exponential function to calculate the contribution of the raw material towards the rise time. By summing-up the influence of various raw materials the rise time could be calculated. The following times were calculated:
 Full rise time including creaming time: 110 s
 Creaming time: 11 s
 Full rise time without creaming time: 99 s The full rise time including the creaming time was used as the full rise time. A symmetrical S-curve was put in between the start point of the foam expansion (after the creaming time) and the full rise (or blow-off) point. To make data processing easier the S-curve was cut into 10 sections. Calculation of such S-curve rise profiles are conventionally known. However, differences between such a calculated rise profile and a real measured rise profile can be observed.

Figure 7:
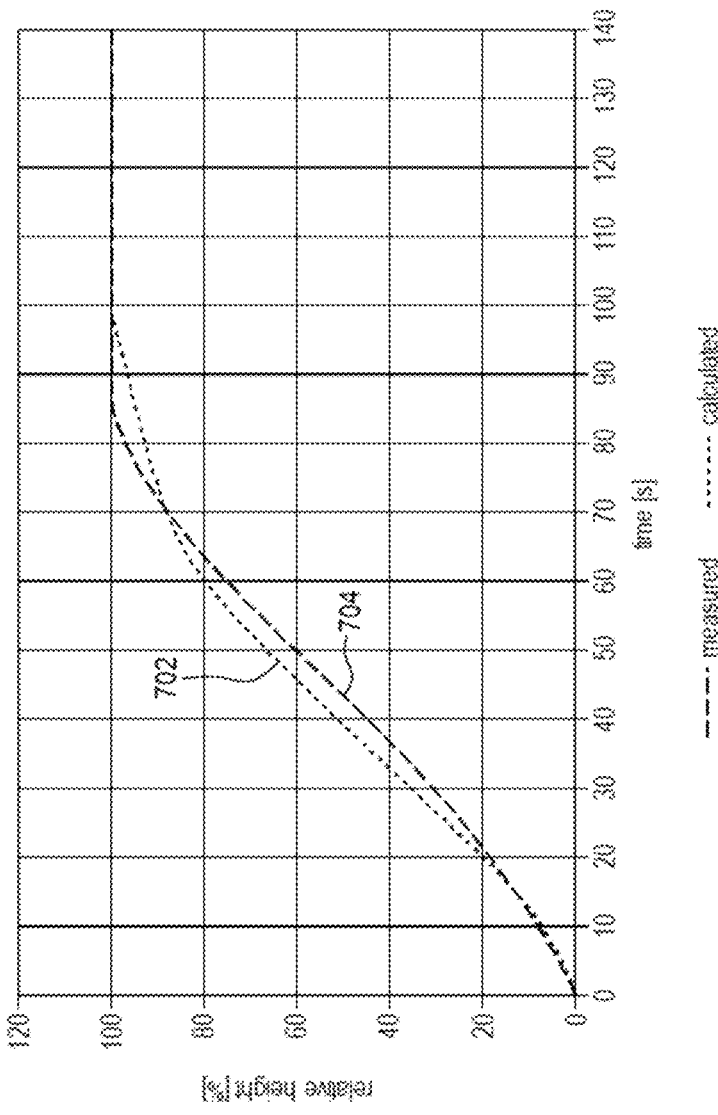
FIG. 7 illustrates calculated and the measured rise profiles without creaming time for a formulation 1 reactive mixture, according to an embodiment of the present disclosure.

For example, FIG. 7 illustrates the calculated rise profile 702 and the measured rise profile 704 (i.e., rise curves) for formulation 1. For better comparison of the curves the creaming time was taken off, meaning that the expansion of the reaction mixture starts right from 0. However, it should be noted that the creaming times were also slightly different.

Although, both curves look similar, the time for the full rise differs by more than 10 s and the height at various times varies to an extent that requires different settings of the fall plate heights (i.e., at various points in time, the heights of the fall plates set according to the measured rise profile deviate significantly from the heights of the fall plates set according to the calculated rise profile). The following lists a) and b) give machine parameters derived from the two rise profiles (i.e., conventionally calculated and measured according to embodiments of the present disclosure) that place the creaming line in the trough (⅔ of the trough height), positions of the full-rise/blow-off line 0.5 m after the end of the fall plate system, make the top surface of the foam looking like a smooth line and provide a block with a height of 1.00 m. List c) give conventional empirical machine parameters used by a foam producer to produce foam according to formulation 1.

a) Machine parameters for the calculated rise profile:
 Output factor: 1.30
 Polyol output: 130 kg/min
 Conveyor speed: 4.05 m/min
 Height trough over conveyor: 66 cm above conveyor base line
 Height end of fall plate 1:37 cm above conveyor base line
 Height end of fall plate 2:27 cm above conveyor base line Height end of fall plate 3:8 cm above conveyor base line
Height end of fall plate 4:2 cm above conveyor base line
Height end of fall plate 5: conveyor height
b) Machine parameters for the measured rise profile
Output factor: 1.45
Polyol output: 145 kg/min
Conveyor speed: 4.55 m/min
Height trough over conveyor: 66 cm above conveyor base line
Height end of fall plate 1:49 cm above conveyor base line
Height end of fall plate 2:40 cm above conveyor base line
Height end of fall plate 3:21 cm above conveyor base line
Height end of fall plate 4:7 cm above conveyor base line
Height end of fall plate 5: conveyor height
c) Empirical machine parameters used by a foam producer to produce foam according to formulation 1:
Output factor: 1.55
Polyol output: 155 kg/min
Conveyor speed: 4.75 m/min
Height trough over conveyor: 66 cm above conveyor base line
Height end of fall plate 1:46 cm above conveyor base line
Height end of fall plate 2:39 cm above conveyor base line
Height end of fall plate 3:24 cm above conveyor base line
Height end of fall plate 4:7 cm above conveyor base line
Height end of fall plate 5: conveyor height Results of the Industrial Trials The industrial trials were done by using the FB 20 foaming machine in subsequent runs of producing foam blocks of 15 m length using the conditions of a) followed by producing foam blocks of 15 m length using the machine parameters of scenario b) and finally producing foam blocks of 30 m length using the standard empirical settings for the machine (for comparison).

The following observations were made during the runs:

|  | Scenario a) Conventional machine parameters using calculated rise profile | Scenario b) Machine parameters using measured rise profile according to embodiments of the present disclosure | Scenario c) Conventional standard empirically-derived machine parameters |
| --- | --- | --- | --- |
| Full rise position | Roughly at the end of the fall plate section at 5.6 m | 0.5 m after the end of the fall plate section at roughly 6.10 m | At 6.45 m (roughly 0.8 m after the end of the fall plate section) |
| Settling | 2-3 cm | 2-3 cm | 2-3 cm |
| Block geometry (during cut-off of blocks) | Roughly rectangular, slightly higher at the sides, beginning of splits at sides in the bottom area where the process liner of the conveyor ends | rectangular shape, no visible defects | Very slight dome effect, block is roughly 1 cm higher in the center of the block. |

Foam blocks were transferred into a curing rack and stored there for 3 days. Afterwards cross-sections were cut from the middle of the blocks. These cross-sections (each 15 cm thick) were transferred to the laboratory for further evaluation. The following properties were obtained:

|  | Scenario a) | Scenario b) | Scenario c) |
| --- | --- | --- | --- |
| Block height [m] | Roughly 1 m, 1.50 cm higher at the sides | Roughly 1 m | Roughly 1 m, 1.0 cm higher in the center |
| Block defects | small split in the bottom sides | No defects *Note: density distr. The smallest | No defects except very slight dome effect |
| Density top [kg/m$^3$] | 23.4 | 23.4 | 23.3 |
| Density middle [kg/m$^3$] | 26.2 | 24.9 | 25.0 |
| Density bottom [kg/m$^3$] | 25.1 | 24.6 | 25.2 |
| Density spread in the block [kg/m$^3$] (highest density from above minus lowest one) | 2.80 | 1.50 | 1.90 |
| Air permeability (center) [standard cubic feet per minute] | 4.2 | 4.1 | 4.3 |
| Hardness CLD 40 [kPa] top | 4.0 | 4.0 | 4.1 |
| Hardness CLD 40 [kPa] middle | 4.3 | 4.3 | 4.4 |
| Hardness CLD 40 [kPa] bottom | 4.4 | 4.2 | 4.5 |
| Hardness CLD 40 spread in the block [kPa] (highest value from above minus lowest one) | 0.4 | 0.3 | 0.4 |
| Cell count [1/cm] | 12 | 12 | 12 |

Upon inspection, most of the blocks are overall free of defects. Only the blocks of scenario a) exhibit the beginning of splits in the bottom area of the sides linked to a too early blow-off on the conveyor. This points directly to a mismatch of the foam expansion curve with the chosen machine settings. The shape of the blocks is perfect for scenario b) with the same height in the center of the block in vertical direction and at the sides. For scenario a) it was observed that the block was 1.5 cm higher at the sides compared to the center. For scenario c) it was the opposite with a higher block in the center (1 cm higher). Of course, the ideal block is rectangular with the same height in the center and at the sides to minimize scrap formation during cutting of foam blocks into mattresses and other consumer goods.

Furthermore, by using the machine parameters generated on the base of the measured rise profile a significantly more homogenous density distribution over the block cross section could be obtained. The density deviation is even slightly better than the values obtained by using empirical parameters of the foam producer. A low density spread in the block is of interest as often a specification for the density is part of the supply agreement for the flexible PU foam. Accepted maximum deviations are often in the range of 10%. Obviously, the parameters obtained with the help of the measured rise profile allow the reaction mixture to expand in a smoother way resulting in a more homogenous density distribution. The calculated rise leads to the highest density spread.

Concerning the hardness, a similar tendency can be observed, but the differences are smaller. The cell counts are comparable.

Overall, the results of the industrial trials using an exemplary reactive mixture (i.e., formulation 1) demonstrates the advantageous use of rise profile data, obtained from discontinuous box foam trials, by simulation software to predict parameters and settings of continuous flexible foaming machines in optimizing the production process. By importing measured rise profile data from tailored box foaming experiments, a more constant and consistent foam quality is obtained in continuous flexible foam production.

Figure 8:
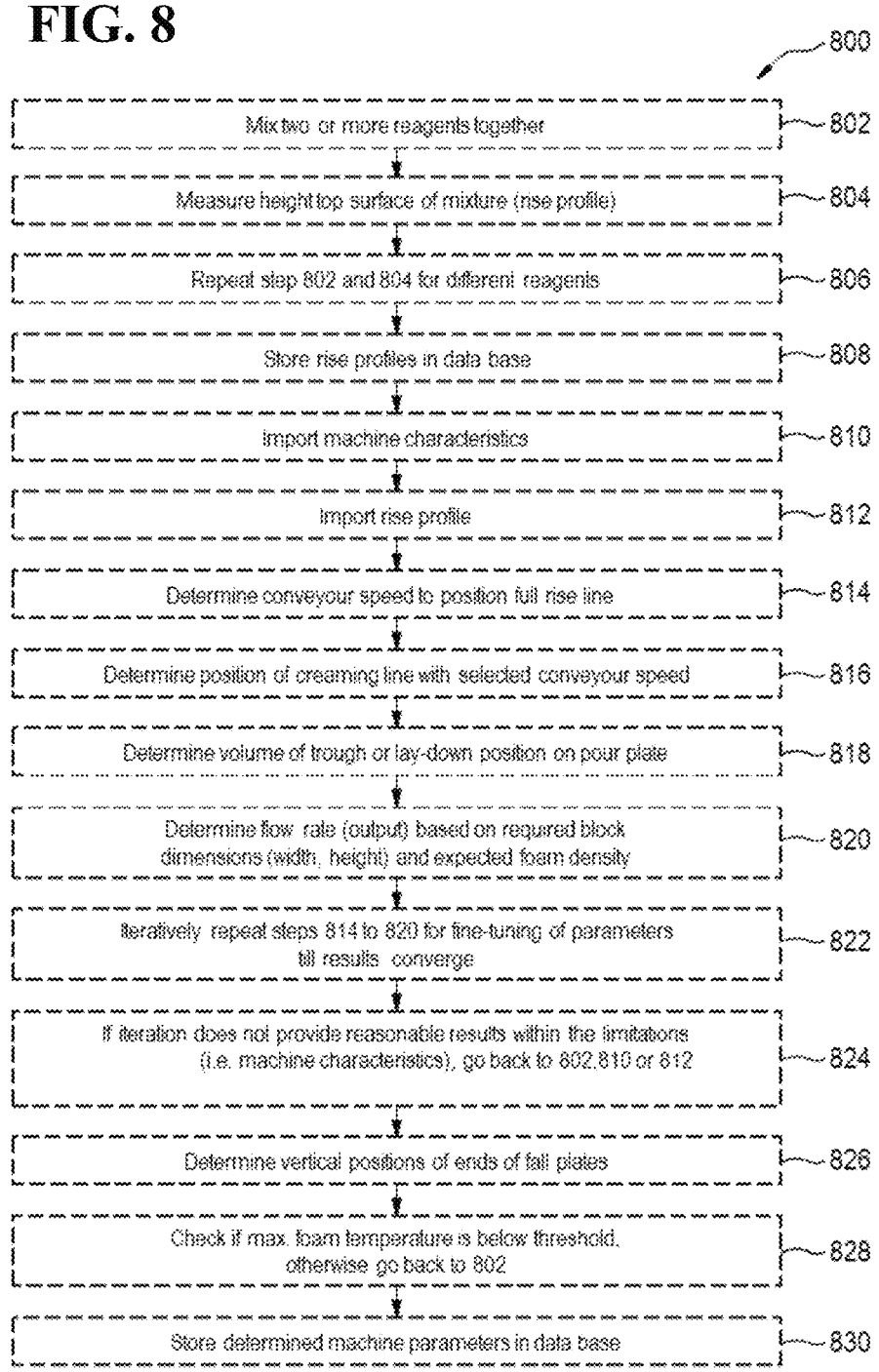
FIG. 8 illustrates a flowchart of a method for setting machine parameters of a foam production machine, according to an embodiment of the present disclosure.

FIG. 8 illustrates a method 800 for setting machine parameters of a foam production machine, according to an embodiment of the present disclosure. The method covers setting machine parameters of foam production machine 100 (FIG. 1) and foam production machine 400 (FIG. 4). The foam production machine 100, 400 includes a mixing head 102 configured to mix precursor reagents for forming a reactive mixture 136, an intermediate conveyance unit 110, 123 configured to receive the reactive mixture from the mixing head, a plurality of fall plates 104, and a conveyor 106 configured to receive the reactive mixture from a last fall plate 104e. The scope of the present embodiment covers the intermediate conveyance unit being a pour plate 110 (FIG. 1) or a trough 123 (FIG. 4). Each fall plate has vertically adjustable ends 118, 120. A proximate end 118a of a first fall plate 104a is configured to receive the reactive mixture from the intermediate conveyance unit. The reactive mixture forms a foam on the conveyor. In one embodiment, the method includes optional steps 802-808, which are identical to steps 202-208 described above in conjunction with FIG. 2. Optional steps 802-808 will not be discussed here in further detail.

In step 810, the database is accessed by a computer system 600 (FIG. 6) for reading (also referred to as importing) characteristics of the foam production machine. In one embodiment, the computer system is a conventional computer system including at least one processor 602 configured to execute software for setting machine parameters of the foam production machine. According to an embodiment, a user of the computer system, upon execution of the software or upon initialization of the software, inputs identification information of the foam production machine utilized by the user, such as a machine name, model number, name of the machine manufacturer and/or or other information that identifies the foam production machine. In response, the processor reads (or imports) characteristics of the respective machine based upon the identification information, either from a database 604 or by accessing an Internet website containing information of the respective machine via the network 606. In another embodiment, the processor, upon execution of the software, queries the user for identification information of the foam production machine, and then imports characteristics of the machine based upon the identification information, either from the database 604 or by accessing an appropriate Internet website via the network 606.

Alternatively, upon initial execution of the software, the computer system may authenticate the user, and upon authentication, the processor reads (i.e., imports) characteristics of a foam production machine from the database based upon a user profile stored in the database. The user profile may include one or more foam production machines and one or more characteristics corresponding to each foam production machine. For example, foam production machines corresponding to the user's profile (i.e., stored in association with the user's profile) may include machines for which machine settings were previously determined by the user or for which respective characteristics were previously imported. In one embodiment, the user indicates from which machine, of the two or more foam production machines corresponding to the user's profile and stored in the database, characteristics are to be imported.

In one embodiment, the characteristics include at least one dimension of the intermediate conveyance unit, a range of conveyor speeds, a number of fall plates and/or a range of vertical positions for the vertically adjustable ends of the fall plates. As will be discussed in more detail further below, the executed software is configured to determine the vertical positions of the adjustable ends of the fall plates based upon an iterative process of adjusting one or more of: at least one dimension of the intermediate conveyance unit, the conveyor speed and a flow rate (output) of the reactive mixture to a first fall plate, given a predefined target height of the foam on the conveyor, an imported rise profile, a position of a creaming line of the reactive mixture before the proximate end of the first fall plate and a position of a blowoff/full rise line of the reactive mixture roughly 0.5 m after a distal end of the last fall plate.

In step 812, the database is accessed by a computer system 600 (FIG. 6) for reading (also referred to as importing) a rise profile for the reactive mixture of the precursor reagents. The rise profile includes a height of the mixture as a function of time as the precursor reagents react. According to an embodiment, the user of the computer system may define components and/or proportions of the components of a reactive mixture, as well as other parameters that effect the reactive rate of the reactive mixture, such as temperature and/or pressure under which the reaction occurs, and in response, the processor reads (or imports) the profile from the database that corresponds to the parameters defined by the user. In one embodiment, the processor, upon executing the software, queries the user for input parameters. In another embodiment the software imports directly creaming time and full rise time from the rise profile file. In another embodiment the software asks the user to input measured creaming time and full rise time. In another embodiment the software analyzes the rise profile curve and determines the creaming time as well as the full rise time by itself.

In one embodiment, the rise profile imported from the database is a laboratory rise profile, as described above in conjunction with steps 202-208 of FIG. 2.

Alternatively, upon initial execution of the software, the computer system may authenticate the user, and upon authentication, the processor reads (or imports) a rise profile from the database based upon a user profile stored in the database. The user profile may include reagents or reactive mixtures previously used by or purchased by the user. In one embodiment, the user indicates which of the rise profiles of the rise profile associated with the user profile and stored in the database to import.

In step 814, a conveyor speed is selected, by the software executed by the computer system, from the range of conveyor speeds. In one embodiment, a conveyor speed approximately in the middle of the range of conveyor speeds of the identified foam production machine is selected. By selecting a conveyor speed that is approximately an average of the maximum and minimum conveyor speeds, the determination of the machine parameters, including determining the vertical positions of the ends of the fall plates, may advantageously require fewer iterations of the iterative process. In another embodiment, a maximum conveyor speed is selected from the range of conveyor speeds. By selecting the maximum conveyor speed from the range of conveyor speeds, the foam production machine is advantageously enabled to produce foam blocks at a maximum production rate. In yet another embodiment, the software determines the conveyor speed to position the full rise line 134 at a predefined location. The full rise line is also referred to as the blowoff line 134. For example, the software calculates the conveyor speed as a blow-off position length divided by the full rise time obtained from the imported rise profile. In one embodiment, the full rise time as well as the creaming time is used from measured data (i.e., also referred to as the full rise time without creaming time). In one embodiment, the full-rise/blow-off position length is defined as a distance 151 after a distal end 120e of the last fall plate 104e, (which in some embodiments is a predefined distance 0.5 m) plus the total length of the fall plates (which is equal to a length of each fall plate times the number of fall plates).

In step 816, the software executed by the computer system determines the creaming line 132 based upon the calculated conveyor speed, using the creaming time as obtained from the imported rise profile.

In step 818, the software executed by the computer system determines a value for a least one dimension of the intermediate conveyance unit 110, 123, based at least on the determined conveyor speed, the determined position of the full rise line and/or the determined position of the creaming line 132 of the reactive mixture as determined in step 816 and 814.

In reference to the pour plate embodiment (FIG. 1), the pour plate 110 is configured to receive the reactive mixture from the mixing head 102. A position of the mixing head 102 is adjustable in a longitudinal direction 143 for depositing the reactive mixture at a laydown position 139 on the pour plate. In one embodiment, the laydown position is measured (i.e., defined) with respect to the proximate end 118a of the first fall plate 104a. Dimensions of the pour plate 110 include the laydown position 139. Another dimension of the pour plate is a vertical height 141 of the nozzle 103 of the mixing had 102 as measured from the pour plate 110.

In one embodiment, a position of the creaming line 132 (FIG. 1) is measured with respect to the proximate end 118a of the first fall plate 104a (e.g., see measurement 133). Thus, and by way of an exemplary example, given a fixed flow rate and a fixed laydown position, as the conveyor speed increases, then the creaming line position value decreases (i.e., moves away from the laydown position and towards, or even past, the proximate end of the first fall plate) and the height h of the block decreases. In contrast, given a fixed flow rate and a fixed laydown position, as the conveyor speed deceases, then the creaming line position value increases (i.e., moves away from the proximate end of the first fall plate and towards the laydown position) and the height of the block h increases.

Thus, in one embodiment of step 818, the software is configured to receive, as input, the determined conveyor speed and the determined creaming line 132 of the reactive mixture before the proximate end 118a of the first fall plate, as determined in step 816, and determine the laydown position that results in the creaming line being approximately equal to the creaming line as determined in step 816. In one embodiment, the creaming line is located approximately 15 cm before the proximate end 118a of the first fall plate 104a.

In reference to the trough embodiment (FIG. 4), the trough 123 includes a lip 130 and a volume for holding the reactive mixture. In one embodiment, the reactive mixture is received from the mixing head 102 via the MTT 124 and the input port 127. The proximate end 118a of the first fall plate 104a is configured to receive the reactive mixture from the lip 130 of the trough 123. Dimensions of the trough include a trough height 145, trough width 147 and trough length 149. If the trough does not have a constant width or length, and average values may be used to define the width and length. According to an embodiment, the height of the trough is the distance between a bottom 126 of the trough 123 and the lip 130 of the trough 123. The trough volume is defined to be the trough width times trough height times trough length.

In one embodiment, a position of the creaming line 132 (FIG. 4) is measured with respect to the bottom 126 of the trough 123. Thus, and by way of an exemplary example, the flow rate, the trough volume, and in some cases, the conveyor speed, determine the position of the creaming line. In a first example, and as illustrated by FIG. 4, if the creaming line 132 is positioned inside the trough, then the flow rate and the trough volume determine the position of the creaming line in the trough as measured from the bottom 126 of the trough 123. However the flow rate, the trough volume and the conveyor speed determines the position of the creaming line. In a preferred embodiment, the creaming line is position in the trough 123, and thus its position as measured from the bottom of the trough depends only upon the volume of the trough and the flow rate of the reactive mixture from the mixing head into the trough.

Considering that the creaming line is positioned in the trough, then for a given selected conveyor speed, as the flow rate increases, a height h of the block of foam on the conveyor 106 increases and the creaming line value 132 (as measure from the bottom of the trough) increases. On the other hand, as the flow rate decreases, a height h of the block of foam on the conveyor 106 decreases and the creaming line value 132 (as measure from the bottom of the trough) decreases.

Thus, in another embodiment of step 818, the software is configured to receive, as input, the determined conveyor speed and the creaming line 132 of the reactive mixture in the trough (i.e., creaming line position value 132 as measured with respect to the bottom of the trough), as determined in step 816, and determine the trough volume that results in the position of the creaming line being approximately equal to the position of the creaming line as determined in step 816.

In one embodiment, the software is configured to determine the trough volume by adjusting at least one of the height, width and length of the trough such that the creaming line of the reactive mixture is equal to the position of the creaming line as determined in step 816, which is one embodiment, is located inside the trough. In another embodiment, the creaming line of the reactive mixture is located a distance of approximately ⅓ the height of the trough below the lip, where the height of the trough is defined to be the distance from the lip of the trough to the bottom of the trough.

The flow rate (output) of the reactive mixture is directly proportional to the flow rate of the precursor reagents through the one or more transport conduits 108. The conduits 108 may be connected to one or more storage containers (not shown) that store the reagents under predetermined conditions. The flow rate of the precursor reagent through the transport conduits, and thus the flow rate of the reactive reagents through the nozzle 103 of the mixing head 102 of the pour plate 110 embodiment of the intermediate conveyance unit and the flow rate of the reactive reagents through the MTT 124 of the trough embodiment of the intermediate conveyance unit, may be controlled by a pump or pumping system (not shown). In step 820, the software is configured to determine a flow rate (output) based upon the determined conveyor speed, such that a foam block having a height of approximately the predetermined height hf with a (predetermined) density is manufactured. For example, increasing the flow rate, given the determined conveyor speed and a given block width, results in an increase of block height, whereas decreasing the flow rate, given the determined conveyor speed and a given block width, results in a decrease of block height. Thus, in one embodiment, the software is configured to receive a predefined block width, predefined block height hf, a predefined block density and the conveyor speed as determined in step 814, and determine the flow rate that results in a block having these characteristics.

Thus, in step 822, the software executed by the computer system iteratively repeats steps 814-820, thereby adjusting (i.e. fine-tuning) the parameters of conveyor speed, creaming line (i.e., position of creaming line), position of the full rise line, at least one dimension of the intermediate conveyance unit (e.g., trough size or lay-down position of pour plate) and flow rate for providing a final flow rate, a final value for the at least one dimension of the intermediate conveyance unit, a final creaming line position a final position of the full rise line and a final conveyor speed such that block has the predefined block height and density, and the creaming line and blowoff line are equal or approximately equal to their predefined (also referred to as preselected) values as set by the user or as defined in a data input file to the software.

For example, in a first iteration of steps 814-820, in conjunction with the pour plate embodiment of the intermediate conveyance unit (FIG. 1), the software determines a new flow rate of the reactive mixture to the first fall plate 104*a*, a new position of the creaming line, and a new value for at least one dimension of the pour plate 110 (e.g., the laydown position and/or the vertical nozzle height) based at least on the new conveyor speed (i.e., the new conveyor speed as adjusted in step 814) and the predetermined target height hf and density of the foam 137 on the conveyor 106, as initially defined and/or selected by the user.

For example, in a first iteration of steps 814-820 in conjunction with the trough embodiment of the intermediate conveyance unit (FIG. 4), the software determines a new flow rate of the reactive mixture to the first fall plate 104*a*, a new position of the creaming line and a new value for at least one dimension of the trough 123 (e.g., a new value for the trough volume based upon adjusting at least one of the three trough dimensions as discussed above) based at least on the new conveyor speed (i.e., the new conveyor speed as adjusted in step 814) and the predefined target height hf and density of the foam 137 on the conveyor 106, as initially defined and/or selected by the user.

In one embodiment, and according to step 822, the software determines an extent of convergence of one or more of the parameters determined in steps 814-820. If the software determines an acceptable convergence of one or more of the determined parameters, then the method continues at step 826. In one embodiment, the software, upon start-up or initialization, receives as input one or more predefined convergence percentages. Exemplary embodiments of predefined convergence percentage values are between 0.2%-0.02%. In one embodiment, the predefined convergence percentage is 0.1%. For example, if there is less than a 0.1% change between successive values of any particular parameter, or in one embodiment, between each of the determined parameters, then a solution has converged, and the method continues at step 826. In another embodiment, the software is configured to repeat steps 814-820 a predefined number of times, such as, for example, between 1-3 times. In one embodiment, the software repeats steps 814-820 two times.

In step 822, if at some point in the iteration the software is unable to repeat steps 814-820, due to, for example, the intermediate conveyance unit not having parameters to which further adjustments can be made, or in other words, due to limits to adjustments to characteristics of any of the components of the foam production machine, the method continues at step 824. In step 824, and in one embodiment, the method alerts the user that additional user-initiated steps be taken. Additional user steps include replacing the intermediate conveyance unit 110, 123 with a different conveyance unit having, e.g., different range of adjustable trough dimensions or pour plate dimensions and/or different range of motion of the mixing head 102, or importing different rise profile(s), or forming a different reactive mixture from a different mixture of reagents that is not currently stored as a rise profile in the database. Thus, according to a decision made by the user in step 824, which may be received as input into the software being executed, the method continues at either step 802 if the user decides to mix different reagents to create a rise profile not currently stored in the database, step 810 if the user decides to replace one or more components of the foam production machine (e.g., replace the intermediate conveyance unit with a different conveyance unit, having, e.g., a different range of trough sizes or a different range of laydown positions, or replace the conveyor with a different conveyor having a different range of conveyor speeds), or at step 812 if the user decides to import a different rise profile.

In step 826, the software executed by the computer system determines, based on the rise profile and the final conveyor speed, vertical positions for the ends of each fall plate resulting in a predefined predicted profile of the reactive mixture on the plurality of fall plates as the reactive mixture is transported along the plurality of fall plates by the conveyor moving at the final conveyor speed. Step 212 (FIG. 2) discloses in more detail the determination, based on the rise profile and the final conveyor speed, of the vertical positions for the ends of each fall plate resulting in a predefined predicted profile of the reactive mixture on the plurality of fall plates. Step 212 is incorporated into the FIG. 8 embodiment of the present disclosure.

In one embodiment, the predefined predicted profile has a substantially flat top surface 304 (FIG. 3). The substantially flat top surface has an inclination angle of approximately arctan [(predefined fraction of a height of a foam on the conveyor)/(a horizontal length of the plurality of inclined fall plates)]. As illustrated by FIG. 3, the predefined fraction of the height of the foam on the conveyor is defined as xhf and the horizontal length of the plurality of inclined fall plates is defined by reference number 308. In one embodiment, the predefined fraction of the height of the foam on the conveyor xhf is approximately ⅓ the height of the foam hf on the conveyor 106.

In step 828, the maximum temperature of the foam during production due to the chemical reaction is calculated using a formula using data on the exotherm energy of the various reactions, the heat capacity of the used raw materials, heat of evaporization of physical blowing agents as well as the start temperature of the raw materials. The resulting temperature represents the maximum temperature in case all raw materials would react completely in one step at once. This value for the maximum temperature is compared to a value for the maximum foam temperature considered to be safe in foam production. In case the value is overstepped a warning is released. Potentially, also the print-out, export from the simulation software or further processing is automatically blocked. The software is therefore configured to compare the calculated max. temperature with the predefined maximum foam temperature, and if the calculated temperature is less or equal to the predefined maximum temperature, the method continues at step 830. If the calculated temperature is greater than the predefined maximum temperature, the method continues at step 802.

In step 830, the software executed by the computer system, stores, in the database 604 and/or 610 (FIG. 6) at least one of: the final flow rate, the final value for the at least one dimension of the intermediate conveyance unit, the final conveyor speed, and the vertical positions for the ends of each fall plate.

According to another embodiment in which the intermediate conveyance unit comprises the trough 123 (FIG. 4), the software executed by the computer system is configured to adjust a position of the trough 123 such that a vertical distance 153 between the lip 130 of the trough 123 and the conveyor 106 is approximately ⅔ of the predefined target height hf of the foam. In one embodiment, the software adjusts the position of the trough between steps 824 and 826 (FIG. 8). However, the scope of the present disclosure includes the software adjusting the position of the trough at or before step 812 (FIG. 8). In yet another embodiment in which the intermediate conveyance unit comprises the pour plate 110 (FIG. 1), the software executed by the computer system is configured to adjust a vertical position of the pour plate such that a vertical distance 155 between the pour plate and the conveyor is approximately ⅔ of the predetermined target height hf of the foam. In one embodiment, the software adjusts the position of the pour plate between steps 824 and 826 (FIG. 8). However, the scope of the present disclosure includes the software adjusting the position of the pour plate at or before step 812 (FIG. 8).

According to a further embodiment, the software executed by the computer system is configured to iteratively repeat, i.e. once or twice, the determining and adjusting (i.e., steps 814-820) for providing the final flow rate, the final value for the at least one dimension of the intermediate conveyance unit and the final conveyor speed.

In another embodiment, the software executed by the computer program is configured to prompt a user to adjust one or more of the determined vertical positions of the ends of each inclined fall plate and/or the conveyor speed for adjusting the predicted profile of the reactive mixture on the conveyor. For example, in one embodiment, the predicated profile, as computed by the software based upon using the final values for flow rate, at least one dimension of the intermediate conveyance unit and conveyor speed, and further based on using the determined vertical positions of the ends of the fall plates and the imported rise profile, for generating a foam of predefined height hf, is displayed to the user of the software via a display or monitor (not shown) communicatively coupled to the computer system 600 (FIG. 6). A user may wish to adjust the predicted profile, such as adjusting a shape of the top surface 304 (FIG. 3) of the profile, or adjusting the inclination angle of the top surface, or perhaps adjusting the top surface to have different portions with different inclination angles. If the user wishes to adjust the predicted profile, the user, in response to the prompt, inputs one or more vertical positions of the ends of each inclined fall plate (e.g., knowing the determined final vertical positions, the user can make adjustments to one or more of the determined final vertical positions and input the adjustments as new vertical positions) and/or inputs a new conveyor speed (e.g., knowing the determined final conveyor speed, the user can make adjustments to the final conveyor speed and input the adjustment as a new conveyor speed). In response to the user entering new values for one or more machine parameters, the software executed by the computer processor is configured to replace any final values as previously determined with the new values and then compute a new predicted profile based on the rise profile and machine parameters as either previously determined or newly replaced. The software can then display the new predicted profile of the reactive mixture on the conveyor to the user via a display or monitor.

In another embodiment, the foam production machine 100, 400 further includes a machine control unit 138 (FIGS. 1 and 4). The machine control unit includes at least one machine processor 140, controller software 142 executable by the processor, and an actuator unit 146 that includes one or more actuators for controlling the settings of the foam production machine. In one embodiment, the machine control unit includes memory 144 configured for storing the controller software 142. The method further includes, executing the controller software by the at least one machine processor, where executing the controller software comprises: (1) receiving data including at least one of: the final value for the at least one dimension of the intermediate conveyance unit, the final conveyor speed, the final flow rate and the determined vertical positions for the ends of each fall plate; (2) generating control signals based on the received data; and (3) sending the control signals to the actuator unit for automatically controlling the settings of the foam production machine (e.g., automatically adjusting or setting machine parameters to the final values in the received data, including setting or adjusting the vertical positions for the ends of each fall plate to the determined vertical positions in the received data).

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Embodiments of the present disclosure may be a system, a method, a product, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Even though the description of the invention and the examples describe a method, a software and/or a production machine with inclined fall plates, which can be controlled and adjustable as described herein, the method, the software and/or the production machine might be adapted with respect of a flat foam production machine and/or method without such fall plates with a vertically increasing foam forming, whereby the embodiments, details, examples and any aspect as described herein shall apply accordingly as fare as feasible. As an example for an analogous method the following shall apply.

The method for determining machine parameters of a foam production machine, the foam production machine including a mixing head configured to mix precursor reagents for forming a reactive mixture, a first segment and/or a conveyor, whereby the first segment and/or conveyor is configured to receive the reactive mixture, the conveyor having an adjustable conveyor speed. The method comprising executing software by a computer system, the computer system including at least one processor, wherein executing the software comprises accessing a database for reading a rise profile for the reactive mixture of the precursor reagents, the rise profile comprising a height of the mixture as a function of time as the precursor reagents react to form a foam; and computing, based on the rise profile the conveyor speed resulting in a predefined predicted profile of the reactive mixture on the conveyor as the reactive mixture is transported along.

In one preferred embodiment the computing, based on the rise profile further machine parameters resulting in a predefined predicted profile of the reactive mixture on the conveyor as the reactive mixture is transported along.

The invention claimed is:

1. A method for automatically setting machine parameters of a foam production machine, the foam production machine comprising:
 a mixing head configured to mix precursor reagents for forming a reactive mixture,
 an intermediate conveyance unit configured to receive the reactive mixture from the mixing head,
 a plurality of fall plates, wherein a proximate end of a first fall plate is configured to receive the reactive mixture from the intermediate conveyance unit and wherein each fall plate has vertically adjustable ends, and
 a conveyor configured to receive the reactive mixture from a last fall plate, the reactive mixture forming a foam on the conveyor, the method comprising:
 executing software by a computer system, the computer system comprising at least one processor, wherein executing the software comprises:
  importing, from a database, characteristics of the foam production machine, the characteristics comprising one or more of:
   at least one dimension of the intermediate conveyance unit,
   a range of conveyor speeds,
   a number of fall plates, or
   a range of vertical positions for the vertically adjustable ends of the fall plates;
  importing, from the database, a rise profile for the reactive mixture of the precursor reagents, the rise profile comprising a height of the mixture as a function of time as the precursor reagents react;
  determining a conveyor speed from the range of conveyor speeds based on the rise profile;
  determining a position of a creaming line and/or a position of a full rise line based on the rise profile and the determined conveyor speed;
  determining a value for the at least one dimension of the intermediate conveyance unit and a flow rate of the reactive mixture to the first fall plate based on at least one of the following:
 the determined conveyor speed, determined position of the creaming line, determined position of the full rise line and/or a predefined target height hr of the foam;
  iteratively repeating the determining for providing a final flow rate, a final value for the at least one dimension of the intermediate conveyance unit, a final conveyor speed and a final position of the creaming line and/or a final position of the full rise line; and
  determining, based on the rise profile and the final conveyor speed, vertical positions for the ends of each fall plate resulting in a predefined predicted profile of the reactive mixture on the plurality of fall plates as the reactive mixture is transported along the plurality of fall plates by the conveyor moving at the final conveyor speed.

2. The method of claim 1, further comprising:
 determining a value for the at least one dimension of the intermediate conveyance unit and a flow rate of the reactive mixture to the first fall plate based at least on the determined conveyor speed, determined position of the creaming line and/or determined position of the full rise line, a predefined target height hr of the foam, and a predetermined density of the foam on the conveyor.

3. The method of claim 1, further comprising:
 storing, in the database, at least one of: the final flow rate, the final value for the at least one dimension of the intermediate conveyance unit, the final conveyor speed, or the vertical positions for the ends of each fall plate.

4. The method of claim 1, wherein the intermediate conveyance unit comprises a trough having a lip and a volume, and wherein the intermediate conveyance unit is configured to receive the reactive mixture from the mixing head or a pour plate configured to receive the reactive mixture from the mixing head, a position of the mixing head being adjustable for depositing the reactive mixture at a laydown position on the pour plate, wherein the proximate end of the first fall plate is configured to receive the reactive mixture from the lip of the trough or from an end of the pour plate distal to the laydown position, wherein the at least one dimension of the trough includes at least one of height, width and length of the trough, wherein the height of the trough is the distance between a bottom of the trough and the lip, and wherein the at least one dimension of the pour plate includes a distance between the laydown position on the pour plate and the proximate end of the first fall plate.

5. The method of claim 1, further comprising:
 between the iteratively repeating and the determining vertical positions for the ends of each fall plate, adjusting a position of the trough such that a vertical distance between the lip of the trough and the conveyor is approximately ⅔ of the predefined target height hr of the foam, or adjusting a position of the pour plate such that a vertical distance between the pour plate and the conveyor is approximately ⅔ of the predefined target height hr of the foam.

6. The method of claim 1, wherein determining the value for the at least one dimension of the trough comprises:
adjusting the volume of the trough by adjusting at least one of the height, width and length such that the determined position of the creaming line of the reactive mixture is located inside the trough.

7. The method of claim 1, wherein the determined position of the creaming line is located a distance of approximately ⅓ the height of the trough below the lip.

8. The method of claim 1, wherein determining the value for the at least one dimension of the pour plate comprises;
selecting the distance between the laydown position on the pour plate and the proximate end of the first fall plate such that the determined position of the creaming line is located approximately 15 cm before the proximate end of the first fall plate.

9. The method of claim 1, wherein determining the flow rate of the reactive mixture to the first fall plate comprises;
determining the flow rate, given the predetermined density, such that a height of the foam on the conveyor matches the predetermined target height hr of the foam.

10. The method of claim 1, wherein determining the value of the at least one dimension of the intermediate conveyance unit is based on positioning the determined position of the creaming line of the reactive mixture before the proximate end of the first fall plate.

11. The method of claim 1, wherein the predefined distance of the determined position of the full rise line after the distal end of the last fall plate is in a range of from 0.2 m to 1.2 m.

12. The method of claim 1, wherein iteratively repeating the determining for providing the final flow rate, the final value for the at least one dimension of the intermediate conveyance unit, the final conveyor speed and the final position of the creaming line and/or the final position of the full rise line comprises iteratively repeating once, twice or several times until values converge to be constant.

13. The method of claim 1, wherein the predefined predicted profile has a substantially flat top surface, the substantially flat top surface having an inclination angle of approximately arctan [(predefined fraction of a height of a foam on the conveyor)/(a horizontal length of the plurality of inclined fall plates)].

14. The method of claim 13, wherein the predefined fraction of the height of the foam on the conveyor is approximately ⅓ the height of the foam on the conveyor.

15. The method of claim 1, further comprising:
prompting, by the software executed by the computer system, a user to adjust one or more of the determined vertical positions of the ends of each inclined fall plate and/or the conveyor speed for adjusting the predicted profile of the reactive mixture on the conveyor.

16. The method of claim 1, wherein the production machine further comprises:
a machine control unit, the machine control unit comprising at least one machine processor, controller software executable by the processor, and an actuator unit that comprises one or more actuators for controlling the settings of the foam production machine, and wherein the method further comprises:
executing the controller software by the at least one machine processor, wherein executing the controller software comprises:
receiving data comprising at least one of:
the final value for the at least one dimension of the intermediate conveyance unit,
the final conveyor speed,
the final flow rate, or
the determined vertical positions for the ends of each fall plate;
generating control signals based on the received data; and
sending the control signals to the actuator unit for automatically controlling the settings of the foam production machine.

17. The method of claim 1, wherein the rise profile is a laboratory rise profile.

18. The method of claim 1, wherein a sensor for determining the rise profile is an ultrasonic measuring sensor and/or a 3D laser scanner.

19. A computer-readable medium, comprising:
instructions that, when executed by a processor or a computer, cause it to perform the method of claim 1.

20. The method of claim 11, wherein the predefined distance of the determined position of the full rise line after the distal end of the last fall plate is in a range of from 0.4 m to 0.7 m.

* * * * *